US012572597B1

(12) United States Patent
Schilders

(10) Patent No.: US 12,572,597 B1
(45) Date of Patent: Mar. 10, 2026

(54) GRAPH-BASED MODELS WITH SIGNAL NODES

(71) Applicants: Infosys Limited, Bangalore (IN); InvertIT Inc., Columbus, IN (US)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 0 days.

(21) Appl. No.: 19/041,435

(22) Filed: Jan. 30, 2025

(51) Int. Cl.
*G06F 16/901* (2019.01)
*G06F 1/04* (2006.01)
*G06F 17/15* (2006.01)

(52) U.S. Cl.
CPC ............ *G06F 16/9024* (2019.01); *G06F 1/04* (2013.01); *G06F 17/15* (2013.01)

(58) Field of Classification Search
None
See application file for complete search history.

(56) References Cited

U.S. PATENT DOCUMENTS

| | | | |
|---|---|---|---|
| 12,056,190 B1 | 8/2024 | Schilders | |
| 12,164,569 B2 | 12/2024 | Schilders | |
| 12,216,652 B2 * | 2/2025 | Schilders | G06F 16/24526 |
| 12,222,986 B2 | 2/2025 | Schilders | |
| 12,229,191 B2 | 2/2025 | Schilders | |

| | | | |
|---|---|---|---|
| 2018/0074870 A1 * | 3/2018 | Park | G06F 16/278 |
| 2018/0341721 A1 * | 11/2018 | Xu | G06F 16/9024 |
| 2021/0200794 A1 * | 7/2021 | Pemmaraju | G06Q 10/10 |
| 2024/0126812 A1 * | 4/2024 | Swaminathan | G06F 16/9024 |
| 2024/0256369 A1 | 8/2024 | Schilders | |
| 2024/0256603 A1 | 8/2024 | Schilders | |
| 2024/0257417 A1 | 8/2024 | Schilders | |
| 2024/0288841 A1 | 8/2024 | Schilders | |
| 2024/0289311 A1 | 8/2024 | Schilders | |
| 2024/0289390 A1 | 8/2024 | Schilders | |
| 2024/0296185 A1 | 9/2024 | Schilders | |

* cited by examiner

*Primary Examiner* — Richard L Bowen
(74) *Attorney, Agent, or Firm* — Finnegan, Henderson, Farabow, Garrett & Dunner, LLP

(57) ABSTRACT

An overlay system is provided that includes a storage element and processing circuitry coupled thereto. The storage element stores an executable graph-based model having various signal nodes and connection links. The processing circuitry receives a stimulus and identifies a first signal node based on the stimulus. The processing circuitry determines a connection link coupled to the first signal node. The connection link includes an outward connection object defining association with the first signal node and an inward connection object defining association with a second signal node. The second signal node is thus identified based on the first connection link. The processing circuitry generates a signal using the first signal node and determines whether a signal potential of the signal exceeds a potential threshold associated with the first signal node. The processing circuitry, based on the signal potential exceeding the potential threshold, communicates the signal to the second signal node.

20 Claims, 17 Drawing Sheets

300B

400B

1216  Re-generate first signal using first set of signal overlay nodes associated with outward connection object of first connection link 1218  Re-generate first signal using second set of signal overlay nodes associated with inward connection object of first connection link 1220  Receive first signal using second signal node Stop

1200

GRAPH-BASED MODELS WITH SIGNAL NODES

FIELD OF THE DISCLOSURE

Various embodiments of the present disclosure relate generally to graph-based models. More specifically, various embodiments of the present disclosure relate to executable graph-based models with signal nodes.

BACKGROUND

Graph-based models are commonly utilized across multiple fields, such as artificial intelligence and database management. These models are composed of nodes (or vertices) and edges, where the vertices symbolize real-world entities and the edges represent the relationships between them. In a standard graph-based model, one vertex (or node) is linked to another by an edge, which signifies a role or relationship between the connected vertices.

When utilizing a graph-based model, a first node communicates with a second node via an edge node that couples the first and second nodes. The first node communicates with the second node by transmitting a signal via the edge node. The signal once transmitted by the first node reaches the second node without being altered. However, in many scenarios, a modification may be required to be made to the signal before it is received by the second node. A lack of modification to the signal may prevent a desired input from being provided to the second node. Such a scenario may prevent the execution of a desired operation and/or generation of a desired output. In real-world scenarios, especially when a large number of nodes are required to communicate with each other, this can result in a significant deviation from the desired output, which negatively impacts overall system performance.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating signal nodes in executable graph-based models are provided substantially as shown in, and described in connection with, at least one of the figures.

The systems and methods disclosed herein provide for an overlay system that includes a storage element and processing circuitry associated with the storage element. The storage element is configured to store an executable graph-based model that includes a plurality of signal nodes and a plurality of connection links. The processing circuitry is configured to receive a stimulus and identify, based on the stimulus, a first signal node from the plurality of signal nodes. The processing circuitry is further configured to determine a first connection link, of the plurality of connection links, coupled to the first signal node, the first connection link including a first outward connection object defining association with the first signal node and a first inward connection object defining association with a second signal node of the plurality of signal nodes. The processing circuitry is further configured to identify, based on the first connection link, the second signal node and generate, using the first signal node, a first signal with a first signal potential. The processing circuitry is further configured to determine whether the first signal potential exceeds a first potential threshold of the first signal node. The processing circuitry is further configured to communicate, based on the determination of whether the first signal potential exceeds the first potential threshold, the first signal to the second signal node using the first connection link.

In some embodiments, the communication of the first signal corresponds to processing of the stimulus.

In some embodiments, the processing circuitry communicates the first signal to the second signal node based on the first signal potential being greater than the first potential threshold.

In some embodiments, the first outward connection object and the first inward connection object have a primary role and a secondary role, respectively. The primary role and the secondary role, collectively, indicate a capacity in which the first signal node and the second signal node are mutually associated. The first signal is communicated in conformity with the primary role and the secondary role.

In some embodiments, the first signal is one of a group consisting of: an excitation signal or an inhibition signal.

In some embodiments, the excitation signal is a positive signal and the inhibition signal is a negative signal.

In some embodiments, the first signal is associated with a timestamp.

In some embodiments, the first signal potential corresponds to a sum of a signal potential of each signal received by the first signal node prior to the generation of the first signal.

In some embodiments, after the first signal is received by the second signal node, the first signal potential continuously decays in accordance with a decay function associated with the second signal node.

In some embodiments, a signal node of the plurality of signal nodes is associated with a node configuration. The node configuration includes at least one of a group consisting of: a signal type, a signal generation function, or a decay function, associated with the signal node.

In some embodiments, the signal type is at least one of a group consisting of: an excitation signal type or an inhibition signal type.

In some embodiments, the overlay system 202 further includes a clock generator. A signal node of the plurality of signal nodes is synchronized with a clock signal of the clock generator. A signal generated by the signal node is synchronized with the clock signal.

In some embodiments, a signal node of the plurality of signal nodes is associated with a corresponding node state. The node state is one of a group consisting of: an excited state, an inhibited state, an idle state, or an unknown state.

In some embodiments, based on a stimulus signal associated with the stimulus being a positive signal, the first signal is an excitation signal.

In some embodiments, based on a stimulus signal associated with the stimulus being a negative signal, the first signal is an inhibition signal.

In some embodiments, the executable graph-based model further includes a plurality of signal overlay nodes. The processing circuitry is further configured to determine, from the plurality of signal overlay nodes, a first set of signal overlay nodes that is associated with the first signal node. The first signal is generated further based on the first set of signal overlay nodes.

In some embodiments, the executable graph-based model further includes a plurality of signal overlay nodes. A second set of signal overlay nodes, a third set of signal overlay nodes, and a fourth set of signal overlay nodes, of the plurality of signal overlay nodes are associated with the first outward connection object, the first inward connection object, and the second signal node, respectively. The processing circuitry is further configured to re-generate the first signal based on at least one of a group consisting of: the second set of signal overlay nodes, the third set of signal overlay nodes, or the fourth set of signal overlay nodes.

In some embodiments, the executable graph-based model further includes a plurality of signal overlay nodes. A first set of signal overlay nodes, a second set of signal overlay nodes, a third set of signal overlay nodes, and a fourth set of signal overlay nodes, of the plurality of signal overlay nodes are associated with the first signal node, the first outward connection object, the first inward connection object, and the second signal node, respectively. The first signal is generated further based on the first set of signal overlay nodes. The processing circuitry is further configured to re-generate the first signal based on at least one of a group consisting of: the second set of signal overlay nodes, the third set of signal overlay nodes, or the fourth set of signal overlay nodes.

In some embodiments, the re-generation of the first signal corresponds to a modification of at least one of a set of parameters associated with the first signal. The set of parameters includes at least one of a group consisting of: an amplitude, a frequency, a phase, polarity, sampling rate, resolution, energy, or signal-to-noise ratio, of the first signal.

In some embodiments, the generation and the re-generation of the first signal are executed further based on a set of parameters associated with the first signal.

In some embodiments, the set of parameters includes at least one of a group consisting of: an amplitude, a frequency, a phase, polarity, sampling rate, resolution, energy, or signal-to-noise ratio, of the first signal.

In some embodiments, the generation and the re-generation of the first signal are performed further based on at least one of a group consisting of: a time shift operation, a time scale operation, a correlation operation, a convolution operation, a Boolean operation, or a statistical operation.

In some embodiments, a node-type of a signal node of the plurality of signal nodes is an edge node-type.

In some embodiments, a connection link of the plurality of connection links is a signal node with a role node-type.

In some embodiments, prior to the generation of the first signal, the processing circuitry is further configured to load, in the executable graph-based model, at least one of a group consisting of: the first signal node, the second signal node, or the first connection link.

In some embodiments, upon communication of the first signal, the processing circuitry is further configured to unload at least one of a group consisting of: the first signal node, the second signal node, or the first connection link, from the executable graph-based model.

In some embodiments, the processing circuitry is further configured to determine a second connection link, of the plurality of connection links, coupled to the second signal node, the second connection link including a second outward connection object defining association with the second signal node and a second inward connection object defining association with the first signal node. The processing circuitry is further configured to generate, using the second signal node, a second signal based on the first signal. The processing circuitry is further configured to determine whether a second signal potential associated with the second signal exceeds a second potential threshold associated with the second signal node. The processing circuitry is further configured to communicate, based on the second signal potential being greater than the second potential threshold, the second signal to the first signal node using the second connection link.

In some embodiments, the processing circuitry is further configured to determine a third connection link, of the plurality of connection links, coupled to the second signal node, the third connection link including a third outward connection object defining association with the second signal node and a third inward connection object defining association with a third signal node. The processing circuitry is further configured to identify, based on the third connection link, the third signal node. The processing circuitry is further configured to generate, using the second signal node, a third signal based on the communicated first signal. The processing circuitry is further configured to determine whether a third signal potential associated with the third signal exceeds a third potential threshold associated with the second signal node. The processing circuitry is further configured to communicate, based on the third signal potential being greater than the third potential threshold, the third signal to the third signal node using the third connection link.

In some embodiments, the processing circuitry is further configured to determine a fourth connection link, of the plurality of connection links, coupled to the third signal node, the fourth connection link including a fourth outward connection object defining association with the third signal node and a fourth inward connection object defining association with the first signal node. The processing circuitry is further configured to identify, based on the fourth connection link, the first signal node. The processing circuitry is further configured to generate, using the third signal node, a fourth signal based on the third signal. The processing circuitry is further configured to determine whether a fourth signal potential associated with the fourth signal exceeds a fourth potential threshold associated with the third signal node. The processing circuitry is further configured to communicate, based on the fourth signal potential being greater than the fourth potential threshold, the fourth signal to the first signal node using the fourth connection link.

In some embodiments, the processing circuitry is further configured to determine a fifth connection link, of the plurality of connection links, coupled to the third signal node, the fifth connection link including a fifth outward connection object defining association with the third signal node and a fifth inward connection object defining association with a fourth signal node. The processing circuitry is further configured to identify, based on the fifth connection link, the fourth signal node. The processing circuitry is further configured to generate, using the third signal node, a fifth signal based on the third signal. The processing circuitry is further configured to determine whether a fifth signal potential associated with the fifth signal exceeds a fifth potential threshold associated with the third signal node. The processing circuitry is further configured to communicate, based on the fifth signal potential being greater than the fifth potential threshold, the fifth signal to the fourth signal node using the fifth connection link.

In some embodiments, the processing circuitry is further configured to determine a sixth connection link, of the plurality of connection links, coupled to the fourth signal node, the sixth connection link including a sixth outward connection object defining association with the fourth signal node and a sixth inward connection object defining association with the second signal node. The processing circuitry is further configured to identify, based on the sixth connection link, the second signal node. The processing circuitry is further configured to generate, using the fourth signal node, a sixth signal based on the fifth signal. The processing circuitry is further configured to determine whether a sixth signal potential associated with the sixth signal exceeds a sixth potential threshold associated with the fourth signal node. The processing circuitry is further configured to communicate, based on the sixth signal potential being greater than the sixth potential threshold, the sixth signal to the second signal node using the sixth connection link.

In some embodiments, the processing circuitry is further configured to identify, based on the stimulus, a seventh signal node from the plurality of signal nodes. The processing circuitry is further configured to determine a seventh connection link, of the plurality of connection links, coupled to the seventh signal node, the seventh connection link including a seventh outward connection object defining association with the seventh signal node and a seventh inward connection object defining association with the second signal node. The seventh inward connection object and the first inward connection object are associated with the second signal node by way of an inward group object. The processing circuitry is further configured to identify based on the seventh connection link, the second signal node. The processing circuitry is further configured to generate, using the seventh signal node, a seventh signal with a seventh signal potential. The processing circuitry is further configured to determine whether the seventh signal potential exceeds a seventh potential threshold associated with the seventh signal node. The processing circuitry is further configured to communicate, based on the seventh signal potential being greater than the seventh potential threshold, the seventh signal to the second signal node using the seventh connection link.

In some embodiments, the processing circuitry is further configured to determine an eighth connection link, of the plurality of connection links, coupled to the first signal node, the eighth outward connection object defining association with the first signal node and the eighth inward connection object defining association with an eighth signal node. The eighth outward connection object and the first outward connection object are associated with the first signal node by way of an outward group object. The processing circuitry is further configured to identify, based on the stimulus, the seventh signal node. The processing circuitry is further configured to communicate, based on the determination of whether the first signal potential exceeds the first potential threshold, the first signal to the seventh signal node.

In some embodiments, a method is disclosed. The method comprises receiving, by processing circuitry of an overlay system, a stimulus. An executable graph-based model is stored in a storage element of the overlay system. The executable graph-based model includes a plurality of signal nodes and a plurality of connection links. The method further comprises identifying, by the processing circuitry, based on the stimulus, a first signal node from the plurality of signal nodes. The method further comprises determining, by the processing circuitry, a first connection link, of the plurality of connection links, coupled to the first signal node. The first connection link includes a first outward connection object defining association with the first signal node and a first inward connection object defining association with a second signal node of the plurality of signal nodes. The method further comprises identifying, by the processing circuitry, based on the first connection link, the second signal node. The method further comprises generating, by the processing circuitry using the first signal node, a signal with a signal potential. The method further comprises determining, by the processing circuitry, whether the signal potential exceeds a potential threshold associated with the first signal node. The method further comprises communicating, by the processing circuitry, the signal to the second signal node using the first connection link based on the determination of whether the signal potential exceeds the potential threshold.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
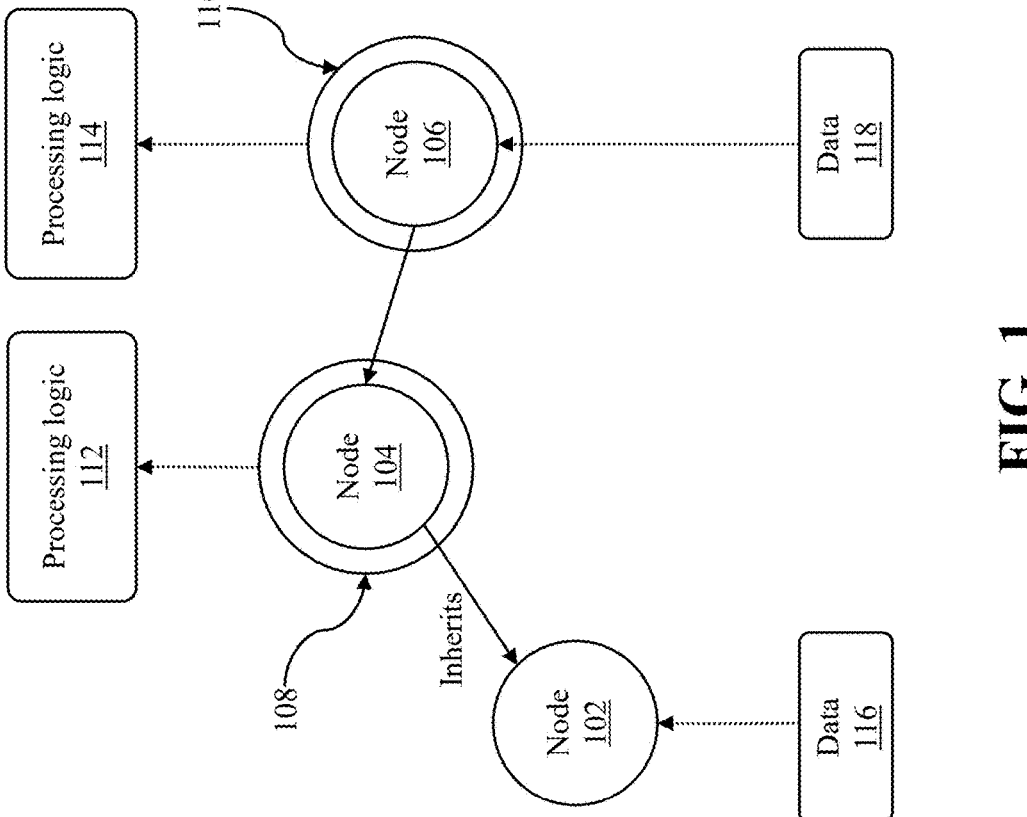
FIG. 1 is a graph that illustrates a composition of an executable graph-based model, consistent with disclosed embodiments of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

With exponential growth in the field of computing, graph-based models have found their application in numerous domains leading to various technologies being implemented using the graph-based models. A technology that is implemented by way of a graph-based model has each unit associated therewith realized as a node in the graph-based model. Traditionally, the graph-based model includes a plurality of vertices and a plurality of edges, with the vertices representing real-world objects and each edge coupling two vertices by way of a role. Such use of the graph-based model enables complete control over even the smallest unit of the technology. Data and processing logic associated with the technology are stored in the graph-based model in form of nodes. This allows for data and processing logic to be used by accessing relevant nodes. In addition, various nodes of the graph-based model may be used based on the communication of signals therebetween. For example, a first node may communicate with a second node by communicating a signal. In an instance, when the first node communicates the signal to the second node, the signal is transmitted from the first node to the second node via an edge that couples the first and second nodes.

In many instances, when the signal is received by the second node, a specific parameter (for example, an amplitude, a waveform, a pitch, a signal-to-noise ratio, or the like) of the signal may be possessed. Such a specific parameter may be required for numerous reasons including, but not limited to, to satisfy a condition associated with an input to be received by the second node, to meet one or more criteria associated with an operation to be performed using the second node, and to achieve a desired response from the second node. However, the traditional graph-based model does not provide a solution to modify the signal generated by the first node such that the signal exhibits the specific parameter before being received by the second node. This leads to various unwanted scenarios such as failure to meet a desired operation or operational condition, data redundancy, latency, low throughput, or the like.

The present disclosure is directed to facilitation of signal nodes in an executable graph-based model of an overlay system. The executable graph-based model is a customized hypergraph with hyper-edges that are realized by way of executable nodes. The realization of a node refers to an instantiation of the node in the executable graph-based model and actuating one or more operations associated with the node in the overlay system. Each executable node is associated with a particular node-type. For example, an edge node corresponds to a base node with an edge node-type. Nodes (for example, base nodes and executable nodes) are connected with other nodes by way of roles included in an edge node therebetween. In some embodiments, roles are represented by way of nodes of role node-type. A role node between two nodes may be indicative of a context regarding an association therebetween. The executable graph-based model also includes a plurality of overlay nodes that incorporate in-situ features (for example, modification of signals) in the overlay system. Each overlay node is associated with one or more nodes (for example, a vertex node, an edge node, or the like) of the executable graph-based model and includes a corresponding processing logic that when executed implements a functionality thereof on the associated nodes. Hence, the processing logic is implemented within the executable graph-based model and is not required to be retrieved from any external system.

The overlay system disclosed herein facilitates signal nodes in the executable graph-based model. A signal node is realized by way of a hyper-edge in the executable graph-based model. Each signal node being a hyper-edge includes a role by way of which it may be associated with another signal node. A first signal node may be associated with a second signal node by way of a connection link. The first signal node may be configured to communicate a first signal to the second signal node via the connection link. The connection link may include an outward connection object (OCO) and an inward connection object (ICO). The OCO may be associated with the first signal node and may be indicative of a primary role associated with the first signal node. The ICO may be associated with the second signal node and may be indicative of a secondary role associated with the second signal node. The primary role and the secondary role indicated by the connection link are indicative of a capacity in which the first signal node and the second signal node are mutually associated. In addition, the connection link may be realized by way of a node within the executable graph-based model. This allows the OCO and the ICO to be associated with one or more overlay nodes (for example, signal overlay nodes). Each signal overlay node may include processing logic that when executed on a signal may modify different parameters (for example, wavelength, pitch, amplitude, or the like) associated with the signal. In a scenario, the first signal node may communicate a signal to the second signal node via the connection link and the signal may undergo one or more modifications when it passes through the OCO and/or the ICO. This allows for a desired parameter of the first signal to be modified before it is received by the second signal node.

Moreover, the first signal communicated by the first signal node may be an excitation signal or an inhibition signal. The excitation signal may be a positive signal and the inhibition signal may be a negative signal. In response to the reception of the first signal, the second signal node may generate a second signal. The second signal may be a cumulation of signal potentials of all signals received by the second signal node. The second signal node may communicate the second signal to a third signal node coupled thereto based on a signal potential of the second signal being greater than a potential threshold associated with the second signal node. Additionally, the signal nodes in the executable graph-based model allow for instantiations of various logical structures (namely, a micro-network) by way of signal nodes communicating excitation signals and/or inhibition signals.

Presently, the graph-based models facilitate the communication of signals among nodes such that a signal communicated by a node reaches another node in its initial state, i.e., without any modification. In many scenarios, such communication of signals may be undesirable as it may prevent the execution of a desired operation due to the absence of a desired signal or a condition induced by the signal. This may lead to various disadvantages such as latency, low throughput, increased complexity, increased cost of processing, or the like. However, the executable graph-based model disclosed herein provides signal nodes that are edge-type nodes. The first signal node is associated with the second signal node by way of the connection link that includes the OCO and the ICO. The OCO and the ICO may be associated with one or more signal overlay nodes. In an instance, when the first signal node may communicate the first signal to the signal node, the one or more signal overlay nodes of the OCO and the ICO may modify the first signal.

The reception of the signal exhibiting a desired parameter allows the overlay system to execute an associated operation without having to wait. Therefore, wait time, latency, throughput, processing time, and other such attributes associated with the performance of the overlay system significantly improve. Moreover, such a feature to manipulate an input to a signal node leads to an improvement in processing complexity based on a requirement of a significantly reduced number of transactions to be executed to achieve a desired input for the signal node. In addition, the above-mentioned features of the overlay system further improve the time complexity and cost complexity of the execution of operations associated with the overlay system.

Figure Description:

FIG. 1 is a graph that illustrates a composition of an executable graph-based model 100, consistent with disclosed embodiments of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlay nodes 108 and 110, respectively. Although not shown, the node 102 can be similarly extended with processing logic via the use of one or more overlays. Each overlay includes processing logic, such as processing logic 112 and 114 which are associated with the overlay nodes 108 and 110, respectively. At run-time, data, such as data 116 and 118, is associated with the nodes 102 and 106, respectively. Further, the overlay nodes 108 and 110 of the nodes 104 and 106, respectively, provide the functionality to respond to stimuli and interact with, manipulate, or otherwise process the data based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2). Throughout the description, the terms "overlay node" and "overlay" are used interchangeably.

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 applies to a range of time-critical systems where efficient processing of the stimuli is required.

Figure 2:
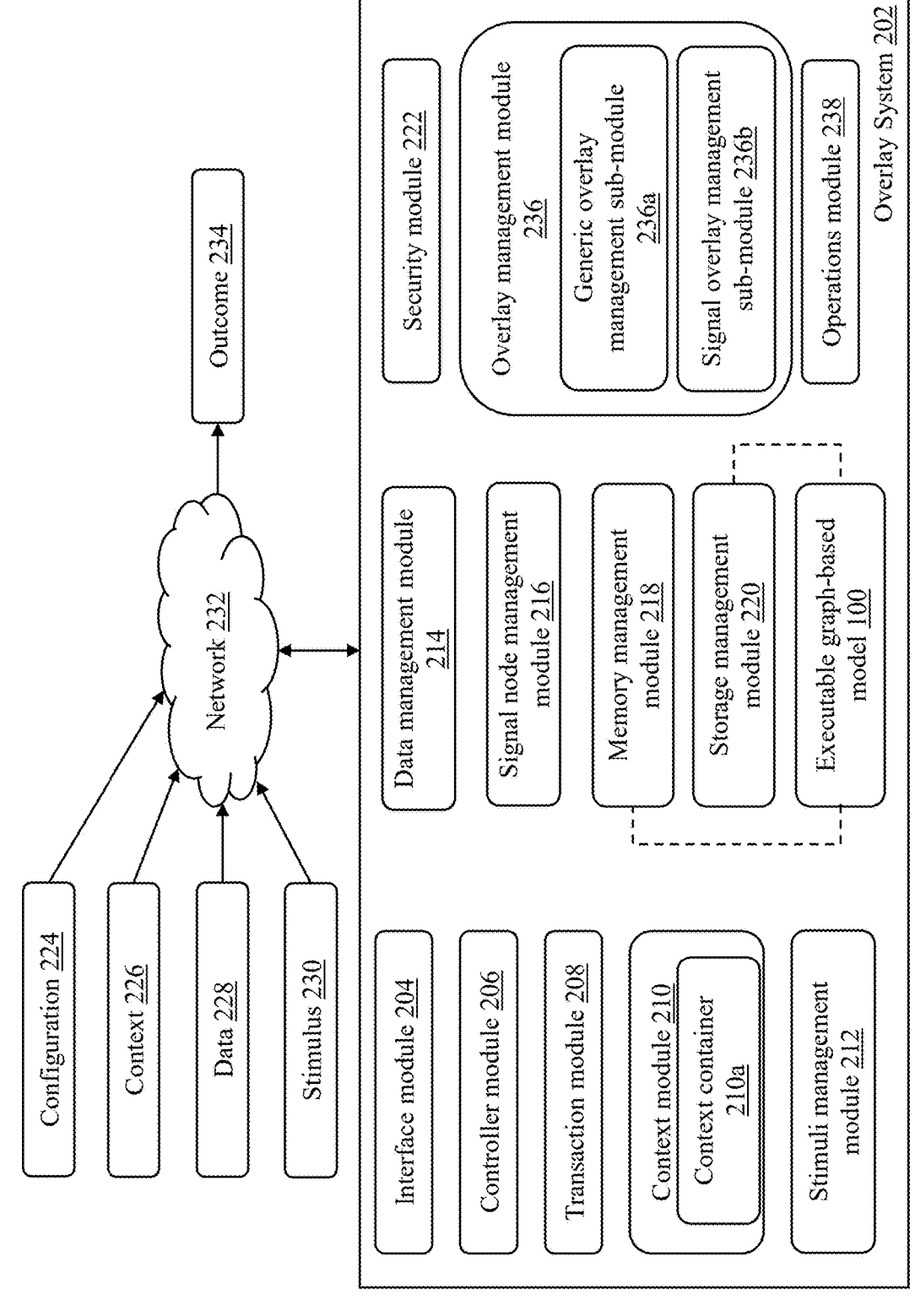
FIG. 2 is a block diagram that illustrates a system environment of an overlay system for execution, management, and configuration of the executable graph-based model, consistent with disclosed embodiments of the present disclosure.

FIG. 2 is a block diagram that illustrates a system environment 200 of an overlay system 202 for execution, management, and configuration of the executable graph-based model 100, consistent with disclosed embodiments of the present disclosure. Referring to FIG. 2, the overlay system 202 includes the executable graph-based model 100. The overlay system 202 further includes an interface module 204, a controller module 206, a transaction module 208, a context module 210, a stimuli management module 212, a data management module 214, a signal node management module 216, a memory management module 218, a storage management module 220, and a security module 222. FIG. 2 further shows a configuration 224, a context 226, data 228, a stimulus 230, a network 232, and an outcome 234. Additionally, the overlay system 202 of the present disclosure includes an overlay management module 236 and an operations module 238. In some embodiments, all the modules of the overlay system 202 except for the executable graph-based model 100 may collectively form processing circuitry that facilitates operations associated with a plurality of nodes including generic nodes and signal nodes, in the executable graph-based model 100. A generic node may refer to nodes, in the executable graph-based model 100, with an edge node-type, a role node-type, or a vertex node-type. A generic node with the vertex node-type is coupled to another generic node with the vertex node-type by way of a node with the edge node-type that is indicative of a role of the generic node. A signal node refers to a node with an edge node-type that associates with another signal node by way of a connection link that includes a primary role for the signal node and a secondary role for the other signal node. The signal node may communicate a signal to the other signal based on a signal potential of the signal exceeding a potential threshold of the signal node. The signal potential may refer to an amplitude of the signal. The potential threshold of the signal node may refer to a threshold amplitude that must be attained by the signal for the signal to be communicated to the other signal node. The signal communicated by the signal node may be an inhibition signal or an excitation signal. The inhibition signal may be a negative signal and the excitation signal may be a positive signal.

The overlay system 202 may include suitable logic, circuitry, interfaces, and/or code, executable by the circuitry, that may be configured to facilitate one or more operations associated with the nodes in the executable graph-based model 100.

The interface module 204 may include suitable logic, circuitry, interfaces, and/or code, executable by the circuitry, configured to provide a common interface between internal modules of the overlay system 202 and/or external sources.

The interface module 204 provides an application programmable interface (API), scripting interface, or any other suitable mechanism for interfacing externally or internally with any module of the overlay system 202. The configuration 224, the context 226, the data 228, and the stimulus 230 may be received by the interface module 204 via the network 232. Similarly, outputs (e.g., the outcome 234) produced by the overlay system 202 are passed by the interface module 204 to the network 232 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the stimulus 230) and their associated contexts (such as the context 226) provide the basis for all interactions within the executable graph-based model 100. Processing of such stimuli may lead to the execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 230) and processes them based on a corresponding context (e.g., the context 226). The context 226 determines the priority that is to be assigned to the processing of the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in the event of an expected or unexpected software or hardware fault or failure. The controller module 206 is configured to handle the processing of the stimulus 230 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture, whereby the stimulus 230 within the overlay system 202 is associated with the context 226 which is used to adapt the handling or processing of the stimulus 230 by the overlay system 202. That is to say that the handling or processing of the stimulus 230 is done based on the context 226 associated therewith. Hence, the stimulus 230 is a contextualized stimulus. The context 226 may include details such as username, password, access token, device information, time stamp, one or more relevant identifiers (IDs), or the like, that are required for processing of the stimulus 230 within the executable graph-based model 100. Each context within the overlay system 202 may be extended to include additional information that is required for the processing of the stimulus (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the context 226) and translating the received context to an operation execution context. In some examples, the operation execution context is larger than the received context because the context module 210 supplements the received context with further information necessary for the processing of the received context. The context module 210 passes the operation execution context to one or more other modules within the overlay system 202 to drive communication of data associated with the operation execution context. Contexts within the overlay system 202 can be external or internal. While some contexts apply to all application areas and problem spaces, some applications may require specific contexts to be generated and used to process the received stimulus 230. As will be described in more detail below, the executable graph-based model 100 is configurable (e.g., via the configuration 224) so as only to execute within a given execution context for a given stimulus.

As shown, the context module 210 includes a context container 210*a* that includes a set of defined contexts. Each defined context of the set of defined contexts pertains to a context that is associated with one or more operations for facilitating the application and management of the plurality of nodes (for example, the signal nodes) in the overlay system 202. That is to say that one or more contexts of the set of defined contexts are indicative of the one or more operations to be executed by way of one or more signal nodes in the overlay system 202. The one or more operations are executed when a context of a corresponding stimuli matches one of the set of defined contexts.

The stimuli management module 212 may include suitable logic, circuitry, interfaces, and/or code, executable by the circuitry, configured to process externally received stimuli (e.g., the stimulus 230) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as the stimulus 230) can be either externally or internally generated. In an example, the stimulus 230 may be a message that is internally triggered (e.g., generated) from any of the modules within the overlay system 202. Such internal generation of the stimulus 230 indicates that something has happened within the overlay system 202 and subsequent handling by one or more other modules within the overlay system 202 may be required. Internal stimulus 230 can also be triggered (e.g., generated) from the execution of processing logic associated with overlays within the executable graph-based model 100. In another example, the stimulus 230 may be externally triggered and may be generated based on an input received via a user interface associated with the controller module 206. The externally triggered stimulus 230 may be received in the form of a signal, a textual, audio, or visual input. The externally triggered stimulus 230 may be associated with the intent of a user to execute an operation indicated by the stimulus 230. The operation is executed in accordance with information included in the context 226 associated with the stimulus 230.

The stimuli management module 212 may receive the stimuli (such as the stimulus 230) in real-time or near-real-time and communicate the received stimuli to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of data associated with each stimulus. In one embodiment, the stimuli management module 212 processes the received stimuli in accordance with a predetermined configuration (e.g., the configuration 224) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change based on the processing of data by any of its nodes. In some examples, the processing of a stimulus (such as the stimulus 230) results in the generation, communication, or processing of data that further results in one or more outcomes (e.g., the outcome 234) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 238 of the overlay system 202.

The data management module 214 may include suitable logic, circuitry, interfaces, and/or code, executable by the circuitry, configured to manage all data or information within the overlay system 202 (e.g., the data 228) for a given application. Operations performed by the data management module 214 include data loading, data unloading, data modeling, and data processing. The data management module 214 is communicatively coupled (e.g., connected either directly or indirectly) to one or more other modules within the overlay system 202 to complete some or all of these operations. For example, data storage is handled by the data management module 214 in conjunction with the memory management module 218 and the storage management module 220.

The signal node management module 216 may include suitable logic, circuitry, interfaces, and/or code, executable by the circuitry, configured to manage the design and implementation of signal nodes in the overlay system 202. The signal node management module 216 is further configured to facilitate one or more operations associated with the signal nodes.

The memory management module 218 may include suitable logic, circuitry, interfaces, and/or code, executable by the circuitry, configured to manage and optimize the memory usage of the overlay system 202. The memory management module 218 thus helps to improve the responsiveness and efficiency of the processing performed by one or more modules within the overlay system 202 by optimizing the memory handling performed by these modules. The memory management module 218 uses direct memory or some form of distributed memory management architecture (e.g., a local or remote caching solution). Additionally, or alternatively, the memory management module 218 deploys multiple different types of memory management architectures and solutions (e.g., reactive caching approaches such as lazy loading or a proactive approach such as write-through cache may be employed). These architectures and solutions are deployed in the form of a flat (single-tiered) or multi-tiered caching architecture where each layer of the caching architecture can be implemented using a different caching technology or architecture solution approach. In such implementations, each cache or caching tier can be configured (e.g., by the configuration 224) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 218 is communicatively coupled (e.g., connected either directly or indirectly) to one or more overlays within the executable graph-based model 100.

The storage management module 220 may include suitable logic, circuitry, interfaces, and/or code, executable by the circuitry, configured to manage the temporary or permanent storage of data associated with the overlay system 202. The storage management module 220 is any suitable low-level storage device solution (such as a file system) or any suitable high-level storage technology such as another database technology (e.g., relational database management system (RDBMS) or NoSQL database). The storage management module 220 is directly connected to the storage device upon which the relevant data is persistently stored. For example, the storage management module 220 can directly address the computer-readable medium (e.g., hard disk drive, external disk drive, or the like) upon which the data is being read or written. Alternatively, the storage management module 220 is connected to the storage device via a network such as the network 232. As will be described in more detail later in the present disclosure, the storage management module 220 uses manifests to manage the interactions between the storage device and the modules within the overlay system 202. In one embodiment, the storage management module 220 is communicatively coupled (e.g., connected either directly or indirectly) to one or more overlays within the executable graph-based model 100. Throughout the description, the term 'storage device' is used interchangeably with the term 'storage element'.

As described, storage, loading, and unloading of the executable graph-based model 100 or one or more components thereof is facilitated by the memory management module 218 and the storage management module 220. The memory management module 218 and the storage management module 220 may facilitate such operations by interacting with the storage device that stores the executable graph-based model 100. The overlay system 202 further includes a plurality of manifest storages. The manifest storages are used by the memory management module 218 and the storage management module 220 to facilitate the storage of manifest states (including manifest template states and manifest instance states) of nodes. The storage element may include a primary storage and a secondary storage. The primary storage may store the executable graph-based model 100 and may also store nodes that are loaded in the executable graph-based model 100. The secondary storage may store node states, manifests, and manifest states associated with nodes that are unloaded from the executable graph-based model 100. Storage and retrieval of nodes are described in detail in conjunction with FIG. 5.

The security module 222 may include suitable logic, circuitry, interfaces, and/or code, executable by the circuitry, configured to manage the security of the overlay system 202. This includes the security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 222 can enforce a hypertext transfer protocol secure (HTTPS) protocol with the necessary certification. As a further example, if the data or information associated with the data associated with the overlay system 202 contains Personally Identifiable Information (PII) or Protected Health Information (PHI), the security module 222 can implement one or more layers of data protection to ensure that the PII or PHI are correctly processed and stored. In an additional example, in implementations whereby the overlay system 202 operates on United States of America citizen medical data, the security module 222 may enforce additional protections or policies as defined by the United States Health Insurance Portability and Accountability Act (HIPAA). Similarly, if the overlay system 202 is deployed in the European Union (EU), the security module 222 may enforce additional protections or policies to ensure that the data processed and maintained by the overlay system 202 complies with the General Data Protection Regulation (GDPR). In one embodiment, the security module 222 is communicatively coupled (e.g., connected either directly or indirectly) to one or more overlays within the executable graph-based model 100, thereby directly connecting security execution to the data/information in the executable graph-based model 100. The security module 222 thus acts as a centralized coordinator that works in conjunction with the overlay management module 236 for managing and executing security-based overlays.

The overlay management module 236 may include suitable logic, circuitry, interfaces, and/or code, executable by the circuitry, configured to manage all overlays within the overlay system 202. The overlays may be generic overlays or signal overlays. Signal overlays are nodes that are associated with one or more signal nodes by way of a direct connection or a connection link. A signal overlay may be associated with a signal node by extending the functionality of the signal node. Alternatively, the signal overlay node may be associated with the signal node by way of a connection link such that the connection link includes a primary role for the signal node and a secondary role for the signal overlay. The signal overlay node may include processing logic that when executed on a signal modifies one or more parameters of the signal and re-generates the signal.

Generic nodes are nodes of the executable graph-based model 100 that are not signal nodes. Generic overlays are associated with generic nodes and/or signal nodes and extend the functionality of the generic nodes and/or signal nodes. Operations performed by the overlay management module 236 include overlay storage management, overlay structure modeling, overlay logic creation and execution, and overlay loading and unloading (within the executable graph-based model 100). The overlay management module 236 is communicatively coupled (e.g., connected either directly or indirectly) to one or more other modules within the overlay system 202 to complete some or all of these operations. For example, overlays can be persisted in some form of physical storage using the storage management module 220 (as described in more detail below). As a further example, overlays can be compiled and preloaded into memory via the memory management module 218 for faster run-time execution.

The overlay management module 236 may include a generic overlay management sub-module 236a and a signal overlay management sub-module 236b. The generic overlay management sub-module 236a is configured to perform operations of the overlay management module 236 that are associated with the generic overlays. The signal overlay management sub-module 236b is configured to perform operations of the overlay management module 236 that are associated with the signal overlays.

The operations module 238 may include suitable logic, circuitry, interfaces, and/or code, executable by the circuitry, configured to track operational metrics and the behavior of all modules of the overlay system 202. Operational metrics of a module are indicative of statistics associated with the performance of the module while performing an operation (for example, communication, data processing, stimulus processing, or the like).

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include, but are not limited to, a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or programming languages.

Although it is described that the overlay system 202 includes a single executable graph-based model (e.g., the executable graph-based model 100), the scope of the present disclosure is not limited to it. In other embodiments, the overlay system 202 may include more than one executable graph-based model, without deviating from the scope of the present disclosure. In such a scenario, each executable graph-based model is implemented and managed in a manner that is similar to the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model are implemented as nodes. As will become clear, this allows executable graph-based models to be flexible, extensible, and highly configurable.

Figure 3A:
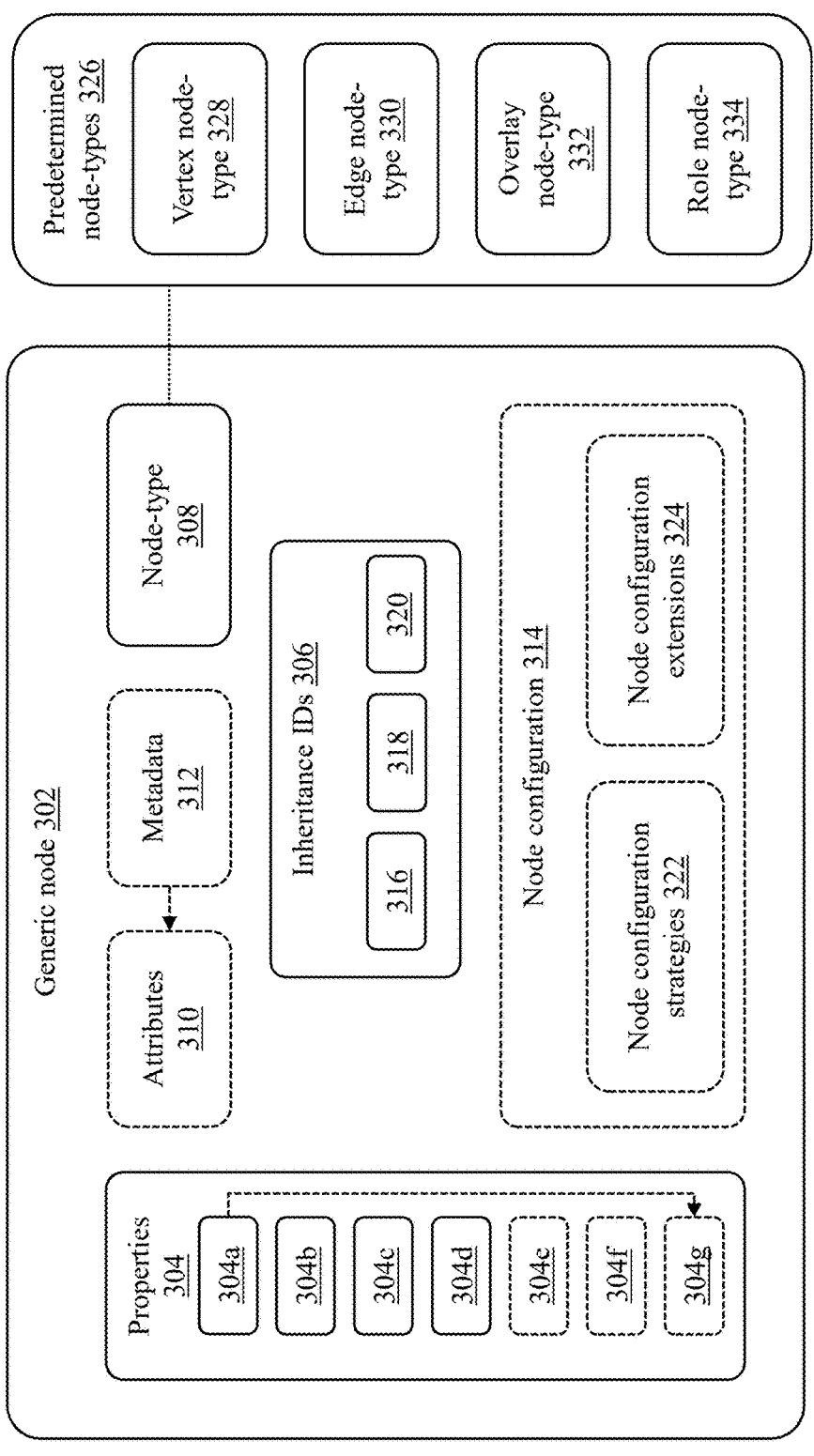
FIG. 3A is a block diagram that illustrates a structure of a generic node within the executable graph-based model, consistent with disclosed embodiments of the present disclosure.

FIG. 3A is a block diagram 300A that illustrates a structure of a generic node 302 within the executable graph-based model 100, consistent with disclosed embodiments of the present disclosure. Referring to FIG. 3A, the generic node 302 corresponds to a generic node of the executable graph-based model 100. The generic node 302 further corresponds to the core structure of the executable graph-based model 100 and forms the foundational building block for all data and processing logic within the executable graph-based model 100. The generic node 302 includes properties 304, inheritance IDs 306, and a node-type 308. The generic node 302 optionally includes one or more attributes 310, metadata 312 associated with the attributes 310, and a node configuration 314.

The properties 304 of the generic node 302 include a unique ID 304a, a version ID 304b, a namespace 304c, and a name 304d. The properties 304 optionally include one or more icons 304e, one or more labels 304f, and one or more alternative IDs 304g. The inheritance IDs 306 of the generic node 302 include an abstract flag 316, a leaf flag 318, and a root flag 320. The node configuration 314 optionally includes one or more node configuration strategies 322 and one or more node configuration extensions 324.

The unique ID 304a is unique for each node within the executable graph-based model 100. The unique ID 304a is used to register, manage, and reference the generic node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the generic node 302 is incremented when the generic node 302 undergoes transactional change. This allows the historical changes between versions of the generic node 302 to be tracked by modules or overlays within the overlay system 202. The namespace 304c of the generic node 302, along with the name 304d of the generic node 302, is used to help organize nodes within the executable graph-based model 100. That is, the generic node 302 is assigned a unique name 304d within the namespace 304c such that the name 304d of the generic node 302 need not be unique within the entire executable graph-based model 100, only within the context of the namespace 304c to which the generic node 302 is assigned. The generic node 302 optionally includes one or more icons 304e which are used to provide a visual representation of the generic node 302 when visualized via a user interface. The one or more icons 304e can include icons at different resolutions and display contexts such that the visualization of the generic node 302 is adapted to different display settings and contexts. The generic node 302 also optionally includes one or more labels 304f which are used to override the name 304d when the generic node 302 is rendered or visualized.

The generic node 302 supports the concept of inheritance of data and processing logic associated with any other node of the executable graph-based model 100 that is inherited by the generic node 302. This allows the behavior and functionality of the generic node 302 to be extended or derived from the inherited node of the executable graph-based model 100. The inheritance IDs 306 of the generic node 302 indicate the inheritance-based information, which may apply to the generic node 302. The inheritance IDs 306 comprise a set of Boolean flags that identify the inheritance structure of the generic node 302. The abstract flag 316 allows the generic node 302 to support the construct of abstraction. When the abstract flag 316 takes a value 'true', the generic node 302 is flagged as abstract that is to say that it cannot be instantiated or created within an executable graph-based model (e.g., the executable graph-based model 100). Thus, in an instance when the generic node 302 has the abstract flag 316 set to 'true', the generic node 302 may only form the foundation of other nodes that inherit therefrom. By default, the abstract flag 316 of the generic node 302 is set to 'false'. The leaf flag 318 is used to indicate whether any other node may inherit from the generic node 302. If the leaf flag 318 is set to 'true', no other node may inherit from the generic node 302 (but unlike an abstract node, a node with the leaf flag 318 set may be instantiated and created within the executable graph-based model 100). The root flag 320 is used to indicate whether the generic node 302 inherits from any other node. If the root flag 320 is set to 'true', the generic node 302 does not inherit from any other node. The generic node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node-type. The node-type 308 of the generic node 302 is used to extend the functionality of the generic node 302. All nodes within the executable graph-based model 100 comprise a node-type that defines additional data structures and implements additional executable functionality. A node-type thus includes data structures and functionality that are common across all nodes that share that node-type. Therefore, the composition of a node with a node-type improves extensibility by allowing the generation of specialized node functionalities for specific application areas. Such extensibility is not present in prior art graph-based models. As illustrated in FIG. 3A, the generic node 302 and the node-type 308 are one logical unit that is not separated in the context of an executing system at run-time (e.g., in the context of execution of an executable graph-based model).

FIG. 3A further shows the plurality of predetermined node-types 326 which provides a non-exhaustive list of node-types for the node-type 308 associated with the generic node 302. The plurality of predetermined node-types 326 includes a vertex node-type 328 and an edge node-type 330. The vertex node-type 328 (also referred to as a data node-type or a value node-type) includes common data structures and functionality related to the 'things' modeled in the graph (e.g., the data). The edge node-type 330 includes common data structures and functionality related to coupling/linking/associating two or more nodes. A node having the edge node-type 330 may connect two or more nodes and thus the edge node-type 330 constructs associations and connections between nodes (for example, objects or 'things') within the executable graph-based model 100. The edge node-type 330 is not restricted to the number of nodes that can be associated or connected by a node having the edge node-type 330. The data structures and functionality of the edge node-type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined node-types 326 further includes an overlay node-type 332 and a role node-type 334. As will be described in more detail below, a node with the overlay node-type 332 is used to extend the functionality of a node, such as the generic node 302, to incorporate processing logic. Unlike non-overlay nodes, an overlay node (e.g., a node having the overlay node-type 332) includes processing logic which determines the functionality of the overlay node. The processing logic of an overlay node includes a block of executable code, or instructions, which carries out one or more operations associated with the communication of data within the executable graph-based model 100. The block of executable code is pre-compiled code, code that requires interpretation at run-time, or a combination of both. Different overlay nodes provide different processing logic to realize different functionality. For example, an encryption overlay node includes an encryption technique using which an associated node is to be protected/secured and processing logic for facilitating such security/protection of the associated node. A publisher overlay node includes a processing logic that when executed publishes data generated by an associated node.

The role node-type 334 defines a connective relationship between two nodes, for example, an edge node and a first vertex node. A node with the role node-type 334 defines a relationship without expressly defining the first vertex node to which the edge node connects. A number of roles (and thus a number of connections) that an edge node-type can have is not limited.

The one or more attributes 310 correspond to the data associated with the generic node 302 (e.g., the data represented by the generic node 302 within the executable graph-based model 100 as handled by the data management module 214). Notably, a node in the executable graph-based model 100 that is not associated with data may not have any attributes. The one or more attributes 310 represent a complex data type. Each attribute of the one or more attributes 310 is composed of an attribute behavior. The attribute behavior may be one of a standard attribute behavior, a reference attribute behavior, a derived attribute behavior, or a complex attribute behavior. The attribute behavior of each attribute defines the behavior of the corresponding attribute. The attribute behavior of each attribute may be configured by associated attribute configurations. The attribute configurations are examples of attribute configuration extensions which are node configuration extensions (e.g., they are part of the one or more node configuration extensions 324 of the generic node 302 shown in FIG. 3A). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with the reference attribute behavior includes appropriate information to obtain a reference data set of possible values. The derived attribute behavior is a behavior that allows read-only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the generic node 302 further includes the metadata 312 (e.g., data stored as a name, a confidentiality indicator for indicating data as sensitive and/or confidential, an average processing time required for processing data, or the like) which is associated with either the generic node 302 or an attribute (for example, the one or more attributes 310) of the generic node 302. An attribute within the one or more attributes 310 may either have an independent state or a shared state. That is to say, an attribute may be a value-shared attribute or a non-value-shared attribute. An independent attribute has data that is not shared with any other node within the executable graph-based model 100. Conversely, a shared attribute has data that is shared with one or more other nodes within the executable graph-based model 100. For example, if two nodes within the executable graph-based model 100 comprise a shared-data attribute with a value state shared by both nodes, updating the data (e.g., the value) of this shared attribute will be reflected across both nodes.

The node configuration 314 provides a high degree of configurations for the different elements of the generic node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304a of the generic node 302, which creates message source IDs. A further example of a concrete node configuration strategy 322 is a versioning strategy, associated with the configuration of the version ID 304b of the generic node 302, which supports major and minor versioning (depending on the type of transactional change incurred by the generic node 302). The versioning strategy may be adapted to a native filing system of a user device hosting the overlay system 202 or a third-party data storage (for example, Snowflake®, or the like) associated with the overlay system 202.

Figure 3B:
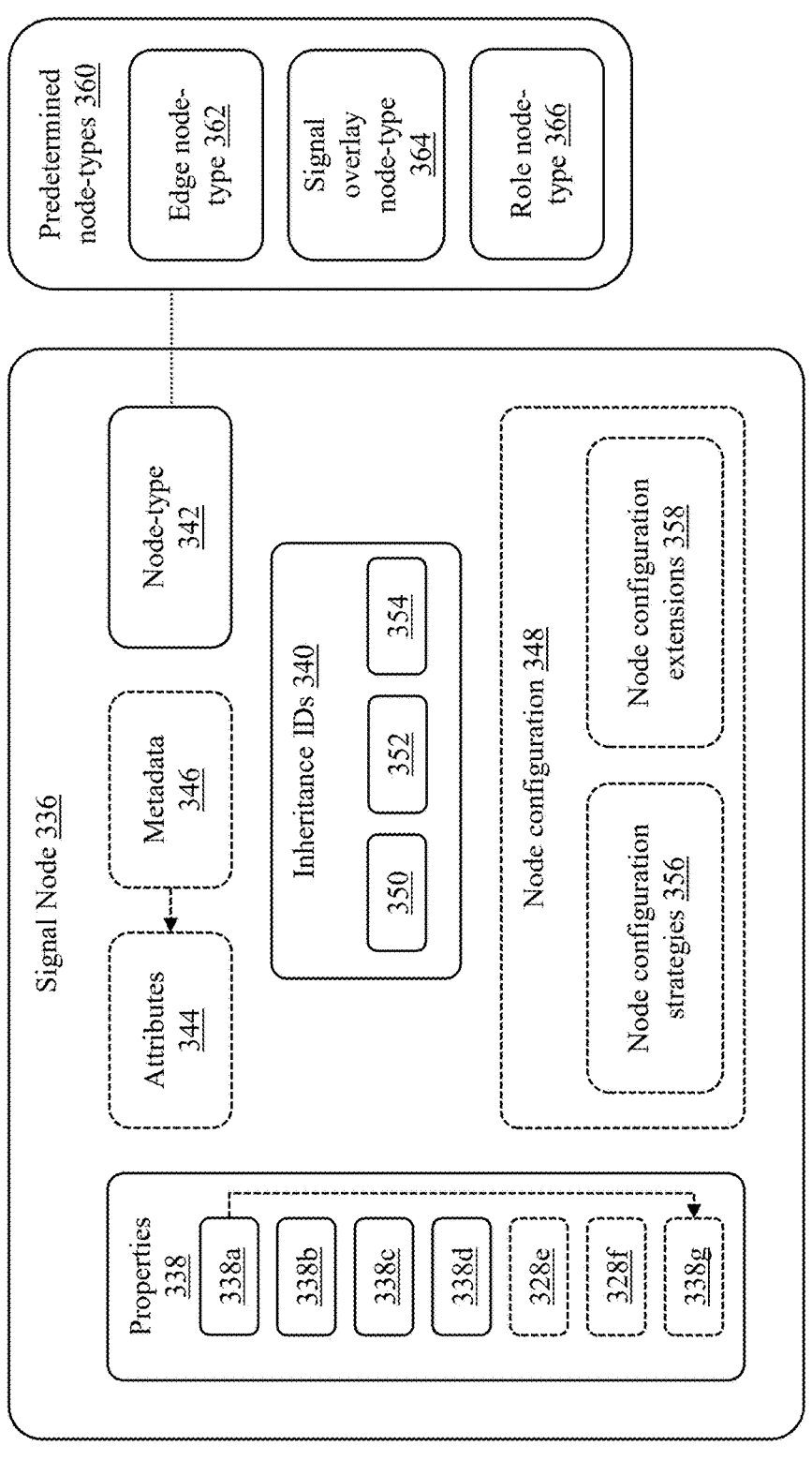
FIG. 3B is a block diagram that illustrates a generic structure of a signal node within the executable graph-based model, consistent with disclosed embodiments of the present disclosure.

FIG. 3B is a block diagram 300B that illustrates a generic structure of a signal node 336 within the executable graph-based model 100, consistent with disclosed embodiments of the present disclosure. Referring to FIG. 3B, the signal node 336 corresponds to the core structure of the executable graph-based model 100 and forms the foundational building block for various data and processing logics within the executable graph-based model 100. The signal node 336 includes properties 338, inheritance IDs 340, a node-type 342, attributes 344, metadata 346, and a node configuration 348.

The properties 338 include a unique ID 338a, a version ID 338b, a namespace 338c, a name 340d, one or more icons 340e, one or more labels 340f, and one or more alternative IDs 340g. The properties 338 of the signal node 336 are the same as the properties 304 of the generic node 302. In other words, the unique ID 338*a*, the version ID 338*b*, the namespace 338*c*, the name 338*d*, the one or more icons 338*e*, the one or more labels 338*f*, and the one or more alternative IDs 338*g* are same as the unique ID 304*a*, the version ID 304*b*, the namespace 304*c*, the name 304*d*, the one or more icons 304*e*, the one or more labels 304*f*, and the one or more alternative IDs 304*g*, respectively, of the generic node 302.

The inheritance IDs 340 of the signal node 336 include an abstract flag 350, a leaf flag 352, and a root flag 354. The inheritance IDs 340 of the signal node 336 are the same as the inheritance IDs 306 of the generic node 302. In other words, the abstract flag 350, the leaf flag 352, and the root flag 354 are the same as the abstract flag 316, the leaf flag 318, and the root flag 320, respectively, of the generic node 302.

The node configuration 348 of the signal node 336 includes node configuration strategies 356 and node configuration extensions 358. The node configuration 348 is the same as the node configuration 314 of the generic node 302. In other words, the node configuration strategies 356 and node configuration extensions 358 of the signal node 336 are the same as the node configuration strategies 322 and the node configuration extensions 324, respectively, of the generic node 302.

The signal node 336 may have the node-type 342 which may be one of predetermined node-types 360. The predetermined node-types 360 of the signal node 336 may include an edge node-type 362, a signal overlay node-type 364, and a role node-type 366. The edge node-type 362 is the same as the edge node-type 330. The role node-type 366 is the same as the role node-type 334. The signal overlay node-type 364 refers to a type of signal node that is a combination of the edge node-type 362 and the overlay node-type 332. A node with signal overlay node-type is an edge node that further includes processing logic that when executed on a signal modifies a set of parameters associated with the signal. The role node-type 366 is the same as the role node-type 334. Notably, the signal node 336 has the edge node-type 362. In some embodiments, the signal node 336 may be a combination of the edge node-type 362 and the role node-type 366. In such embodiments, the signal node 336 may exhibit properties of the edge node-type 362 as well as the role node-type 366. Also, in such embodiments, the signal node 336 may be a connection node and form a part (for example, an inward connection object (ICO), an outward connection object (OCO), or the like) of a connection link that couples an associated signal node with another signal node. In some embodiments, the signal node 336 may be associated with another signal node by way of a connection link that includes an ICO and an OCO. The signal node 336 may be associated with the ICO or the OCO such that the signal node may own the associated ICO or OCO. Further, the associated ICO or the OCO may also be indicative of a primary role or secondary role associated with the signal node 336.

The signal node 336 may be configured to generate a signal based on a received input. The signal node 336 may have a node configuration that includes a signal type, a signal generation function, a convolution function, and a decay function, associated with the signal node 336.

The signal type of the signal node 336 may refer to a type of signal (for example, an excitation signal type, an inhibition signal type, or the like) that may be generated by the signal node 336 based on the stimulus 230. The type of signal may be the excitation signal type and/or the inhibition signal type. In an instance, the signal type of the signal node 336 may be the excitation signal type. In such an instance, the signal node 336 may generate an excitation signal. In another instance, the signal type of the signal node 336 may be the inhibition signal type. In such an instance, the signal node 336 may generate an inhibition signal. In an instance, the signal type of the signal node 336 may be the excitation signal type and the inhibition signal type. In such an instance, the signal node 336 may generate the excitation signal or the inhibition signal based on the stimulus 230. The excitation signal is a positive signal whereas the inhibition signal is a negative signal. When a stimulus signal associated with the stimulus 230 (for example, an input signal) is a positive signal, the signal node 336 may generate the excitation signal. On the contrary, when the stimulus signal associated with the stimulus 230 is a negative signal, the signal node 336 may generate the inhibition signal.

The signal generation function of the signal node 336 may refer to a logical function, a Boolean function, a mathematical function, or the like, in accordance with which the signal node 336 may generate the signal.

The signal node 336 may receive a signal as an input. Each signal received/generated by a signal node is associated with a signal potential that corresponds to an amplitude of the signal. A signal communicated by a signal node may be an output of a convolution operation performed on a set of signals including a signal generated by the signal node and one or more signals received by the signal node. The convolution operation may be performed in conformity with a convolution function associated with the signal node. Notably, the convolution operation may be performed to integrate signal potentials associated with the generated signal and the received signals. The convolution function associated with a signal node may refer to a logical function, a Boolean function, a mathematical function, or the like, in accordance with which the signal received by the signal node and the signal generated by the signal node may be integrated to generate a signal associated with the signal node.

The signal received by the signal node 336 and the signal generated by the signal node 336 may decay in accordance with a decay function associated with the signal node 336. In other words, the decay function associated with the signal node 336 may refer to a logical function, a Boolean function, a mathematical function, or the like, in accordance with which the signal received by the signal node 336 and the signal generated by the signal node 336 may continuously decay. In some embodiments, the continuous decay of the signal may occur during a predefined time interval. The continuous decay may refer to a steady drop in the signal potential of the signal in conformity with the decay function associated with the signal node 336.

The overlay system 202 further includes a clock generator (not shown) that is configured to generate a clock signal. The signal node 336 may be synchronized with the clock signal generated by the clock generator. This results in the signal (for example, the excitation signal or the inhibition signal) generated by the signal node 336 being synchronized with the clock signal generated by the clock generator. This also allows the signal to be associated with a timestamp. Such association with the timestamp allows for the determination of a time-instance of generation of the signal. Notably, the decay of the signal in accordance with the decay function may be initiated after the time instance of the generation of the signal. Also, the signal potential of the signal may be an integration of signal potentials of all signals received by the signal node 336 till the time instance of the generation of the signal in accordance with the convolution function associated with the signal node 336.

In some embodiments, the signal node 336 may be associated with a node state. The node state may be an excited state, an inhibited state, an idle state, or an unknown state. The signal node 336 is said to be in the excited state when generating the excitation signal. The signal node 336 is said to be in the inhibited state when generating the inhibition signal. The signal node 336 is said to be in the idle state when there is no signal being generated by the signal node 336. The signal node 336 is said to be in the unknown state when a current state of the signal node 336 may be indeterminate. Such a state may be caused due to frequent toggling of the node state of the signal node 336, conflicting or undefined input, noise, or the like.

In some embodiments, the signal node 336 may be associated with a potential threshold. The potential threshold may refer to a reference signal potential which must be exceeded by the signal potential of the signal generated by the signal node 336 to be transmitted to another signal node associated with the signal node 336. Notably, the potential threshold may be specific to signal node 336 and may vary for other signal nodes in the executable graph-based model 100.

In some embodiments, the signal generated by the signal node 336 may be associated with a set of parameters including an amplitude, a frequency, a phase, a polarity, a sampling rate, a resolution, an energy, a signal-to-noise ratio (SNR), or the like. The amplitude of the signal may refer to a maximum value of the signal, representing strength or intensity of the signal. The frequency of the signal refers to a rate at which the signal repeats its cycle. It may be measured in Hertz (Hz) and may define a number of cycles per second the signal completes. Signals with higher frequencies repeat faster, and signals with lower frequencies repeat more slowly. The phase of the signal refers to a position of a point in time on a waveform relative to a reference point. Phase is usually measured in degrees or radians and is important in determining how signals align with each other in time. The polarity of the signal refers to a direction or orientation of the signal. The direction or orientation of the signal may be positive or negative. The sampling rate of the signal refers to a frequency at which the signal (for example, an analog signal, a digital signal, or the like) is measured or captured over time. The resolution of the signal refers to the smallest change in the signal that can be detected or measured. The SNR is a measure that compares a level of the signal to a level of background noise. A higher SNR indicates a clearer signal, while a lower SNR means the signal is harder to distinguish from the noise. The set of parameters associated with the signal may be modified to modify or re-generate the signal. Throughout the description, the modification of the signal is the same as the re-generation of the signal.

For the sake of brevity, a node of the executable graph-based model 100, that is not a signal node, is referred to as a generic node. Additionally, an overlay node of the executable graph-based model 100 that is a signal node is referred to as a signal overlay node.

Figure 4A:
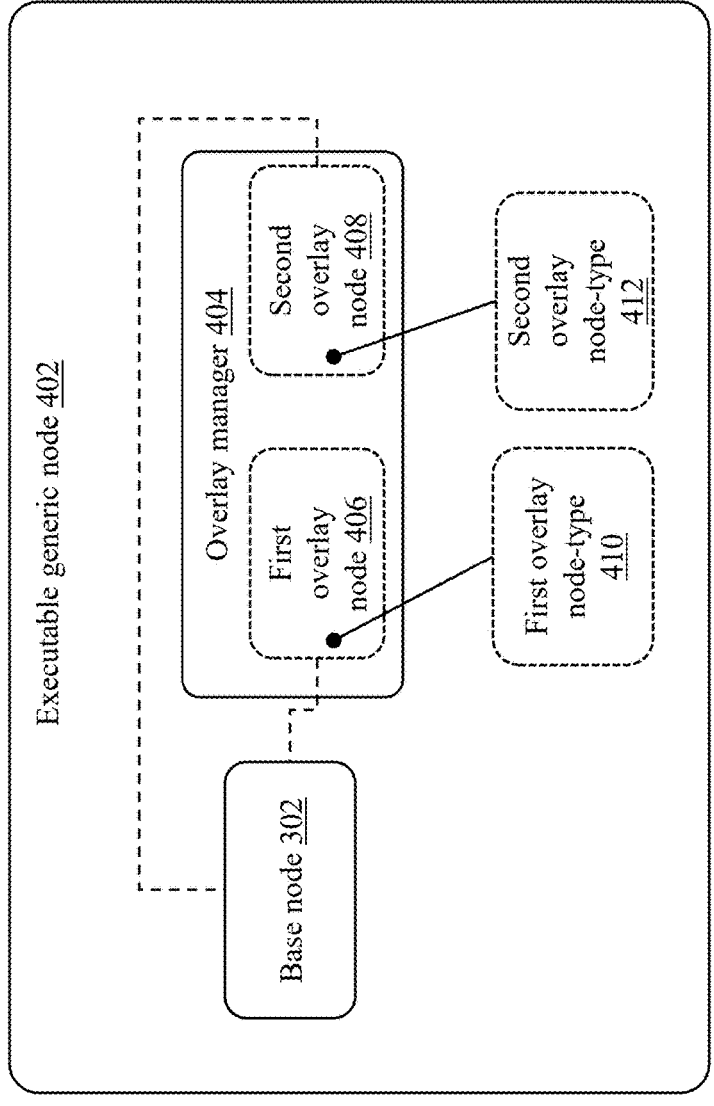
FIG. 4A is a block diagram that illustrates an executable generic node within the executable graph-based model, consistent with disclosed embodiments of the present disclosure.
Figure 4A:

FIG. 4A is a block diagram 400A that illustrates an executable generic node 402 within the executable graph-based model 100, consistent with disclosed embodiments of the present disclosure. Referring to FIG. 4A, the executable generic node 402 is shown to include a base node (e.g., the generic node 302) and an overlay manager 404. For the sake of ongoing discussion, the base node corresponds to generic node 302, and is hereinafter referred to as the "base node 302". The base node 302 when extended by way of one or more overlay nodes becomes the executable generic node 402.

The overlay manager 404 includes a first overlay node 406 and a second overlay node 408. The executable generic node 402 provides processing functionality (e.g., processing logic) to the base node 302 via one or more associated overlay nodes (for example, the first and second overlay nodes 406 and 408). Beneficially, the data and processing capability of the base node 302 may be dynamically and significantly extended using the concept of an executable node (for example, the executable generic node 402). As shown, the first overlay node 406 has a first overlay node-type 410, and the second overlay node 408 has a second overlay node-type 412. Examples of overlay node-type include, but are not limited to, an encryption overlay node-type and a publisher overlay node-type.

A node with the encryption overlay node-type is an encryption overlay node that is indicative of an encryption technique using which an associated node is to be secured. The encryption overlay node also includes processing logic to secure a corresponding node. Examples of the encryption technique include a symmetric encryption algorithm, an asymmetric encryption algorithm, a combination of these, or any other encryption technique. A node with the publisher overlay node-type is a publisher overlay node that is indicative of an operation of publishing an output of an associated node. The publisher overlay node also includes processing logic to publish the output.

Although, the executable generic node 402 is shown to include the first and second overlay nodes 406 and 408, in other embodiments, the executable generic node 402 may include any number of overlay nodes, without deviating from the scope of the present disclosure.

The executable generic node 402 extends the base node 302 (or is a subtype of the base node 302) such that all the functionality and properties of the base node 302 are accessible to the executable generic node 402. The executable generic node 402 also dynamically extends the functionality of the base node 302 by associating the overlay nodes maintained by the overlay manager 404 with the base node 302. The executable generic node 402 may thus be considered a combination of the base node 302 and the first and second overlay nodes 406 and 408. The executable generic node 402 may be alternatively referred to as a node with overlay(s). Therefore, the executable generic node 402 acts as a decorator of the base node 302 adding the functionality of the overlay manager 404 to the base node 302.

It will be apparent to a person skilled in the art that the base node 302 refers to any suitable node within the executable graph-based model 100. As such, the base node 302 may be a node having a node-type such as a vertex node-type, an edge node-type, an overlay node-type, a role node-type, or the like. Alternatively, the base node 302 may be an executable node such that the functionality of the (executable) base node 302 is dynamically extended. In this way, complex and powerful processing functionality can be dynamically generated by associating and extending overlay nodes.

The overlay manager 404 registers and maintains one or more overlay nodes (such as the first overlay node 406 and the second overlay node 408) associated with the base node 302. The assignment of the first and second overlay nodes 406 and 408 to the base node 302 (via the overlay manager 404) endows the base node 302 with processing logic and executable functionality defined within the first and second overlay nodes 406 and 408.

Extending the functionality of a base node through one or more overlay nodes is at the heart of the overlay system 202. As illustrated in FIG. 2, the data (e.g., a vertex node as represented by the base node 302 in FIG. 4A) and the functionality that acts upon that data (e.g., an overlay node) can be separated and independently maintained offline, but at run-time, an association between the data node and the overlay node is determined and an executable node is generated (e.g., the executable generic node 402 shown in FIG. 4A).

It will be apparent to a person skilled in the art that functionalities of the first and second overlay nodes 406 and 408 may be performed by a single overlay node that includes processing logic associated with both of the first and second overlay nodes 406 and 408.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node may include a unique ID, a name, etc., and can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node-type of the node to which the overlay node is applied.

An overlay node, such as the first overlay node 406 or the second overlay node 408, is not bound to a single executable node or a single executable graph-based model (unlike nodes that have non-overlay node-types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 404 of the executable generic node 402 is responsible for executing all overlays registered therewith. The overlay manager 404 also coordinates the execution of all associated overlay nodes. As shown in FIG. 4A, the executable generic node 402 associates the base node 302 with two overlay nodes that is the first overlay node 406 and the second overlay node 408. Thus, the overlay manager 404 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 404 and are associated with an overlay via a node configuration extension for the overlay.

Figure 4B:
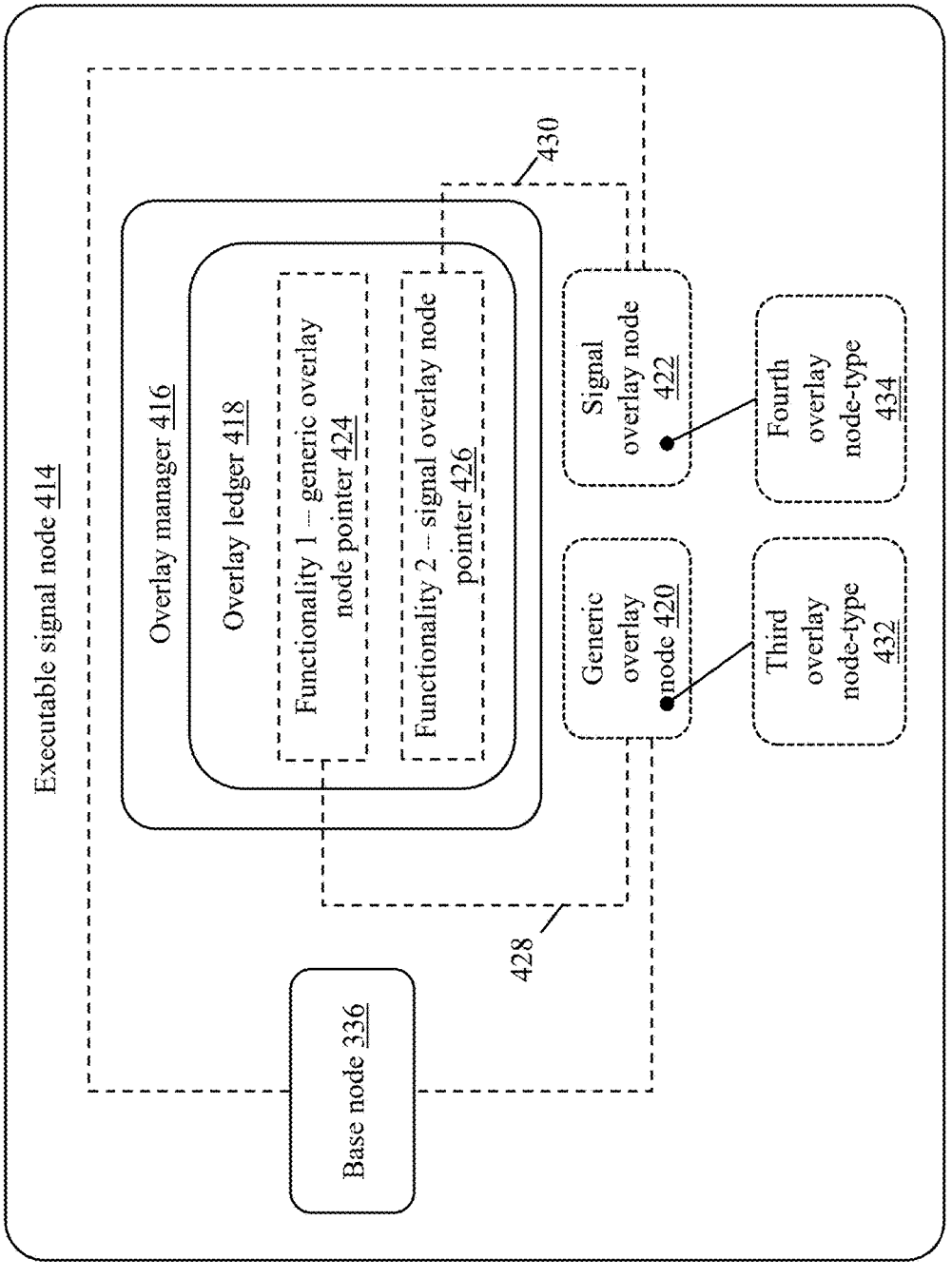
FIG. 4B is a block diagram that illustrates an executable signal node within the executable graph-based model, consistent with disclosed embodiments of the present disclosure.

FIG. 4B is a block diagram 400B that illustrates an executable signal node 414 within the executable graph-based model 100, consistent with disclosed embodiments of the present disclosure. Referring to FIG. 4B, the executable signal node is shown to include a base node (for example, the signal node 336) and an overlay manager 416. Hereinafter, the base node is referred to as the base node 336. The base node 336 being a signal node may have the edge node-type 362. The base node 336 may be associated with a generic overlay node and/or a signal overlay node. Notably, a signal overlay node may be associated only with a signal node, an ICO, an OCO, or any other component of the signal node. In other words, the signal overlay node may not be associated with a generic node. The overlay manager 416 has a description that is similar to the description of the overlay manager 404. In addition, the overlay manager 416 creates and maintains an overlay ledger 418.

The overlay ledger 418 may refer to a list of overlays associated with the base node 336 and functionalities associated with each of the overlays. The overlay ledger 418 further includes a pointer associated with each entry in the overlay ledger 418 that points to a corresponding overlay node associated with the base node 336. As shown, the base node 336 is extended by way of a generic overlay node 420 and a signal overlay node 422. Based on the association of the generic overlay node 420 and the signal overlay node 422 with the base node 336, the overlay manager 416 creates entries 424 and 426 for the generic overlay node 420 and the signal overlay node 422, respectively. As shown, for the generic overlay node 420 and the signal overlay node 422, the entries 424 and 426 include functionalities and pointers 428 and 430, respectively, that point to corresponding overlay nodes. For example, the pointer 428 associated with the entry 424 points to the generic overlay node 420, and the pointer 430 associated with the entry 426 points to the signal overlay node 422. The generic overlay node 420 may have a third overlay node-type 432 whereas the signal overlay node 422 may have a fourth overlay node-type 434. The third overlay node-type 432 may be the same as the first and second overlay node-types 410 and 412 as described in conjunction with FIG. 4A.

Figure 6:
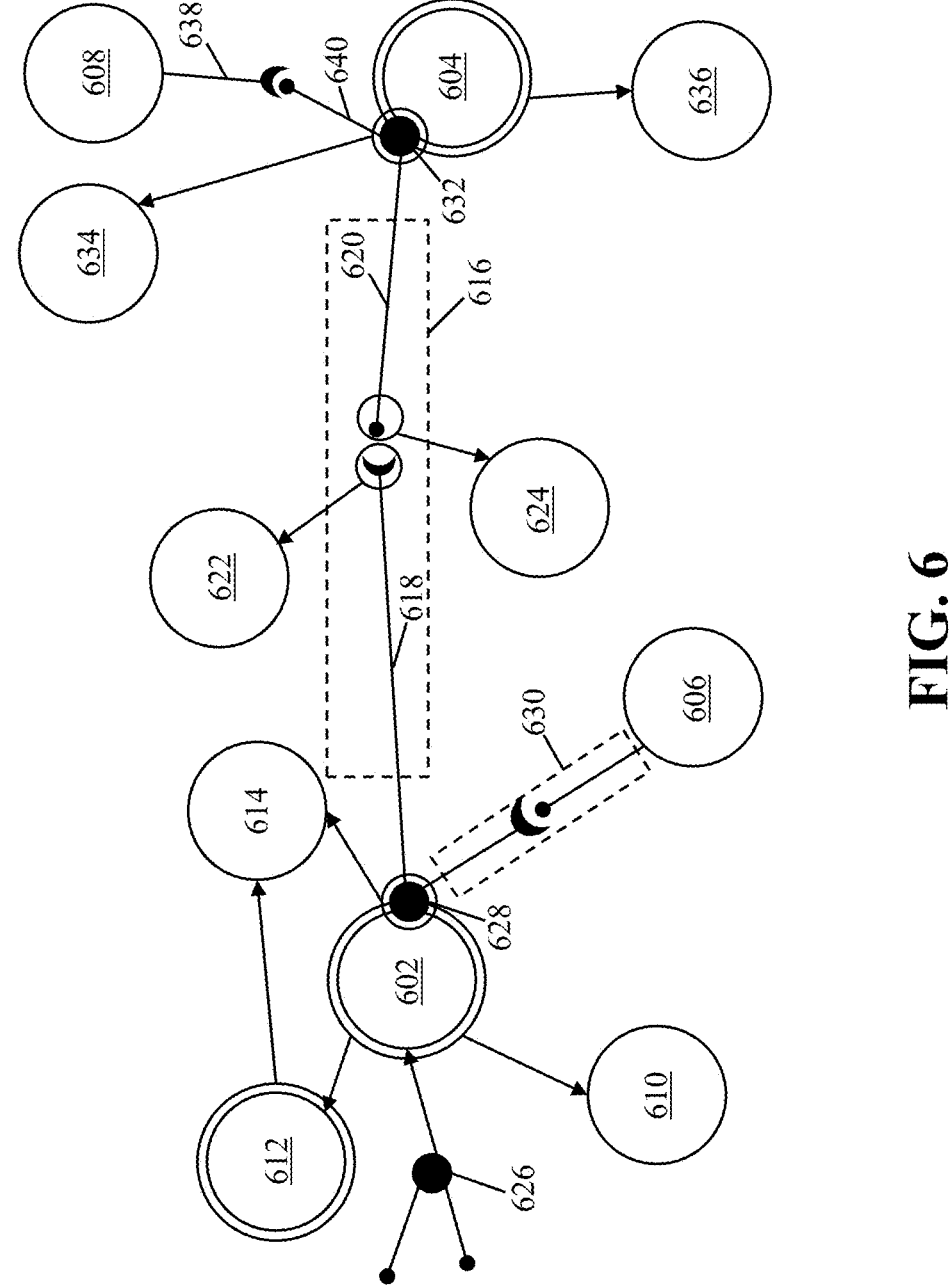
FIG. 6 illustrates a graph that depicts features of signal nodes, consistent with disclosed embodiments of the present disclosure.

The signal overlay node 422 may be an overlay node that may be associated with a signal node or other components (shown in FIG. 6) associated with the signal node that are described in detail in conjunction with FIG. 6. Notably, the structure of the signal overlay node 422 may be the same as the signal node 336. The signal overlay node 422 may include processing logic that when executed on a signal may modify a set of parameters (described in conjunction with FIG. 3B) associated with the signal. Such modification of the set of parameters may refer to modification or re-generation of the signal. The signal overlay node 422 may have a fourth overlay node-type 434. Examples of the fourth overlay node-type 434 may include, but are not limited to, a time shift overlay node-type, a time scale overlay node-type, a correlation node-type, an integration overlay node-type, a Boolean overlay node-type, and a statistical overlay node-type.

The signal overlay node 422 with the time shift overlay node-type may include processing logic that when executed on a signal may execute a time shift operation on the signal. The execution of the time shift operation on the signal refers to a process of shifting the signal forward or backward in time. This operation modifies the signal's time domain behavior without affecting its amplitude, frequency, or shape.

The signal overlay node 422 with the time scale overlay node-type may include processing logic that when executed on a signal may execute a time scaling operation on the signal. The execution of the time scaling operation on the signal refers to a process of stretching or compressing the signal in the time domain. The process changes a rate at which the signal evolves over time by either speeding it up (compressing) or slowing it down (stretching). Time scaling affects how quickly or slowly the signal's values occur, without altering its amplitude.

The signal overlay node 422 with the correlation overlay node-type may include processing logic that when executed on two or more signals may execute a correlation operation on the two or more signals. The execution of the correlation operation refers to a process of applying a mathematical technique to the signals to measure a similarity or a degree of alignment between the signals as one or more signals are shifted relative to other signals.

The signal overlay node 422 with the integration overlay node-type may include processing logic that when executed on two or more signals may execute an operation to combine/integrate two or more signals to produce an integrated signal that represents how one signal modifies or influences other signals. Integration is widely used to understand system responses, filter signals, and analyze the signals.

The signal overlay node 422 with the Boolean overlay node-type may include processing logic that when executed on two or more signals may execute a Boolean operation (for example, AND, OR, NOT, XOR, or the like) on the two or more signals. The execution of the correlation operation refers to a process of applying a Boolean operation on the signals to generate a desired signal. In some embodiments, the signals are represented by binary values (0 and 1), and the Boolean operations are used to manipulate these signals according to logic rules.

The signal overlay node 422 with the statistical overlay node-type may include processing logic that when executed may apply various statistical operations on one or more signals. Applying statistical operations on signals involves applying various statistical methods (for example, mean, variance and standard deviation, root mean square (RMS), or the like) to analyze, process, and understand the characteristics of signals. These operations help extract meaningful information from signals, such as trends, variability, noise, or underlying patterns, and are widely used in areas like signal processing, communications, and data analysis.

In an instance, one of the generic overlay node 420 and the signal overlay node 422 may be required to be executed. In such an instance, the overlay manager 416 may identify a relevant overlay node based on the functionality of one of the generic overlay node 420 and the signal overlay node 422 as listed in the overlay ledger 418. Upon identification of the relevant overlay node, the overlay manager 416 may trigger the relevant overlay node by way of the corresponding pointer.

In some embodiments, the data and the processing logic associated with generic overlays and signal overlays may be non-persistent. Such generic overlays and signal overlays are known as stateless overlays. Notably, processing logic and outputs associated with stateless overlays cease to exist based on the unloading of the overlays and require to be recreated as and when required.

In some embodiments, the data and the processing logic associated with generic overlays and signal overlays may be persistent. Such generic overlays and signal overlays are known as stateful overlays. Notably, processing logic and outputs associated with stateful overlays get stored in the storage element of the overlay system 202 and may be loaded in the executable graph-based model 100 and used as and when required. The persistent nature of the data and the processing logic associated with an executable node and an associated overlay node (e.g., generic overlay and signal overlay) are described in detail in conjunction with FIG. 5.

Throughout the description, an executable node (for example, the executable generic node 402 and the executable signal node 414) is represented by way of two concentric circles. In other words, the executable node is represented by way of an inner circle encircled by an outer circle, where the inner circle represents a base node and the outer circle represents an overlay node associated with the base node.

Figure 5:
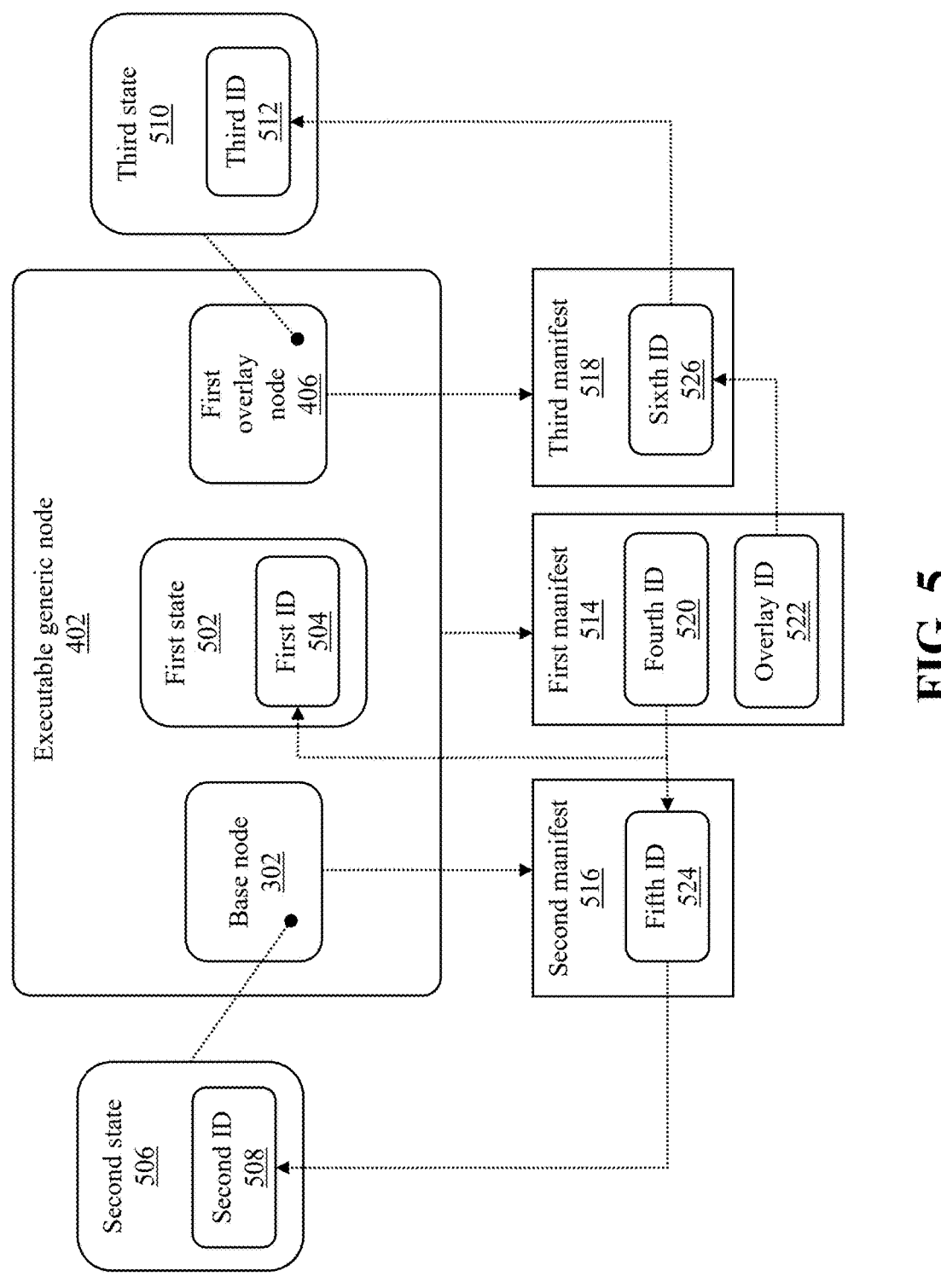
FIG. 5 is a block diagram that illustrates a composition of the executable generic node that enables persistent storage of data and processing logic associated therewith, consistent with disclosed embodiments of the present disclosure.

FIG. 5 is a block diagram 500 that illustrates a composition of the executable generic node 402 that enables persistent storage of data and the processing logic associated therewith, consistent with disclosed embodiments of the present disclosure.

As described in conjunction with FIG. 4A, the executable generic node 402 includes the base node 302 and one or more overlay nodes (e.g., the first and second overlay nodes 406 and 408). For the brevity of the ongoing description, the persistent storage is explained for the executable generic node 402 including only the first overlay node 406. One or more operations performed for ensuring the persistence of the first overlay node 406 may be performed for the second overlay node 408 as well.

Referring to FIG. 5, the executable generic node 402 includes the base node 302 and the first overlay node 406. The executable generic node 402 has a corresponding first state 502 having a first ID 504. The base node 302 has a second state 506 having a second ID 508, and the first overlay node 406 has a third state 510 having a third ID 512. A manifest (for example, first through third manifests 514-518) is generated for each of the base node 302, the executable generic node 402, and the first overlay node 406. In an embodiment, the manifests may be generated by the storage management module 220. The first manifest 514 is associated with the executable generic node 402 and has a fourth ID 520 and an overlay ID 522. The second manifest 516 is associated with the base node 302 and has a fifth ID 524. The third manifest 518 is associated with the first overlay node 406 and has a sixth ID 526. Further, the manifests are stored at respective storage locations that may be centralized or distributed storage locations associated with the overlay system 202. The manifests may be stored by the storage management module 220.

The first state 502 of the executable generic node 402 includes data required to reconstruct the executable generic node 402 (e.g., attributes, properties, etc.). The first state 502 of the executable generic node 402 is persistently stored along with the first ID 504. The first manifest 514 is generated for the executable generic node 402 and has (i) the fourth ID 520 (which is the same as the first ID 504), (ii) the storage location of the first state 502 of the executable generic node 402, and (iii) the overlay ID 522 (which is the same as the sixth ID 526). Notably, the fourth ID 520 is the same as the first ID 504 and the fifth ID 524, hence, the first manifest 514 includes the ID of the state of the base node 302 and the executable generic node 402. Further, the overlay ID 522 is the same as the sixth ID 526 of the state of the first overlay node 406. Therefore, the first manifest 514 may be used to identify and retrieve the states of the base node 302, the executable generic node 402, and the first overlay node 406. Subsequently, the retrieved states may be used to reconstruct the executable generic node 402 and the first overlay node 406. In an instance, the executable generic node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the base node 302 includes data required to reconstruct the base node 302 (e.g., attributes, properties, etc.) and is persistently stored along with the second ID 508. The second manifest 516 is generated for the base node 302 and has the fifth ID 524 and the storage location of the second state 506 of the base node 302. The second ID 508 of the second state 506 and the fifth ID 524 of the second manifest 516 are the same as the first ID 504 of the first state 502 of the executable generic node 402 (which is also the same as the fourth ID 520 of the first manifest 514 of the executable generic node 402). As mentioned above, along with the first state 502, the first manifest 514 may also be used to identify and retrieve the second manifest 516 which in turn may be used to identify the second state 506 of the base node 302. A second manifest state (not shown) is then generated for the second manifest 516 and persistently stored along with the fifth ID 524. Thus, the states, manifests, and manifest states for the executable generic node 402 and the base node 302 include the same, shared, ID. A shared ID can be used in this instance because the states, manifests, and manifest states are stored separately. The separate storage of the states, manifests, and manifest states exhibit a distributed architecture of the overlay system 202.

The third state 510 of the first overlay node 406 includes data required to reconstruct the first overlay node 406 (e.g., attributes, properties, processing logic, etc.) and is persistently stored along with the third ID 512. The third manifest 518 is generated for the first overlay node 406 and includes the sixth ID 526, which is the same as the third ID 512. Therefore, the first manifest 514 may be further used to identify and retrieve the third manifest 518 which in turn may be used to identify and retrieve the third state 510 of the first overlay node 406. A third manifest state (not shown) is then generated for the third manifest 518 and is persistently stored along with the sixth ID 526.

In operation, when the executable generic node 402 is to be loaded, the transaction module 208, in conjunction with the storage management module 220, may execute one or more operations to retrieve the first manifest state stored at a known storage location. Based on the first manifest state, the storage management module 220 may re-construct the first manifest 514 which includes the fourth ID 520 which is the same as the fifth ID 524 of the second manifest 516. Based on the fifth ID 524, the storage management module 220 may identify the second manifest state and may generate the second manifest 516 based on which the second state 506 is identified. Subsequently, the base node 302 is loaded and the storage management module 220 may determine that the base node is a node with overlay. Based on the fourth ID 520 (that is the same as the first ID 504 of the first state 502 of the executable generic node 402) of the first manifest 514, the first state 502 is identified and retrieved. Subsequently, the executable generic node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the first overlay node 406 is reconstructed and loaded in the executable graph-based model 100.

Based on a context of a stimulus (for example, the stimulus 230) associated with the overlay system 202, the processing circuitry (such as the context module 210) may determine an ID that is the same as the fifth ID 524. Based on the determined ID, the processing circuitry (such as the memory management module 218 and the storage management module 220) may identify the second manifest 516. Subsequently, the processing circuitry (such as the memory management module 218 and the storage management module 220) may identify the second state 506 that has the second ID 508 that matches the fifth ID 524. Further, the processing circuitry (such as the memory management module 218 and the storage management module 220) may retrieve the second state 506 associated with the second manifest 516 from a corresponding storage element. Subsequently, the processing circuitry (such as the memory management module 218 and the storage management module 220) may determine, by checking the manifest storage(s) associated with the overlay system 202, whether there is another manifest (such as the first manifest of the executable generic node 402) with an ID that matches the second ID 508 and the fifth ID 524. Notably, the first manifest 514 includes storage locations of each overlay node (for example, the first overlay node 406) of the executable generic node 402. Based on the overlay ID 522 included in the first manifest 514 that matches the sixth ID 526 included in the third manifest 518, the processing circuitry (such as the memory management module 218 and the storage management module 220) may identify and retrieve the third manifest 518 from a manifest storage of a plurality of manifest storages of the overlay system 202. Subsequently, the processing circuitry (such as the memory management module 218 and the storage management module 220) may identify the third state 510 which has the third ID 512 that matches the sixth ID 526. Further, the processing circuitry (such as the memory management module 218 and the storage management module 220) may retrieve the third state 510 associated with the third manifest 518 from a corresponding storage element. To determine whether the first overlay node 406 has an overlay node associated therewith, the processing circuitry (such as the memory management module 218 and the storage management module 220) may also perform a check to determine whether any of the plurality of manifest storages of the overlay system 202 includes any other manifest with an ID that matches the sixth ID 526. Since the first overlay node 406 does not have an overlay associated therewith, no other manifest has the ID that matches the sixth ID.

Notably, the manifest (the third manifest 518) of the first overlay node 406 includes a reference (such as an identifier that is common to the second manifest 516 and the third manifest 518, a link, a path, a storage location, or the like) to the second manifest 516 of the base node 302. Therefore, the re-formation of the executable generic node 402 includes re-creation of the first overlay node 406 prior to re-creation of the base node 302. Subsequently, the first overlay node 406 and the base node 302 are organized by associating the base node 302 with the first overlay node 406 to re-form the executable generic node 402.

In some embodiments, the first overlay node 406 may not be loaded in case it is not required for executing the operation associated with the stimulus 230. The loaded executable generic node 402 and the first overlay node 406 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time. Further, the data and the processing logic associated with the executable node/overlay node are transferred to external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, the management and storage of manifests is managed by the controller module 206, the memory management module 218, the storage management module 220, a combination of these, or any other module of the overlay system 202. Also, all manifest states are stored together at a storage location (such as a manifest storage) that is known to the storage management module 220. Such centralized storage of the manifest states ensures that node states associated therewith are easily accessible.

It will be apparent to a person skilled in the art that although FIG. 5 illustrates only a single generic overlay node associated with a generic node, in other embodiments, the executable generic node 402 may include additional or different generic overlay nodes (for example, the second overlay node 408). It will also be apparent to a person skilled in the art that only those overlay nodes that are required for responding to the stimulus 230 may be loaded.

It will be apparent to a person skilled in the art that the executable signal node 414 may be loaded in a manner that is similar to the loading of the executable generic node 402.

The overlay system 202 described in conjunction with FIGS. 1-5 is used to facilitate one or more operations associated with the plurality of signal nodes in the executable graph-based model 100. Various concepts and features associated with the signal nodes are described in detail later in the description.

FIG. 6 illustrates a graph 600 that depicts features of signal nodes, consistent with disclosed embodiments of the present disclosure. Referring to FIG. 6, shown is the executable graph-based model 100 that includes the plurality of signal nodes including signal nodes 602 through 608. The signal node 602 is extended by way of signal overlay nodes 610 and 612 and hence is referred to as the executable signal node 602. The signal overlay node 612 is extended by way of another signal overlay node 614.

As shown, the executable signal node 602 is associated with the executable signal node 604 by way of a connection link enclosed within a dotted box 616 and referred to as the connection link 616. The connection link 616 includes an OCO 618 and an ICO 620. In other words, the OCO 618 and the ICO 620, collectively, form the connection link 616. The OCO 618 is owned by the executable signal node 602 whereas the ICO 620 is owned by the executable signal node 604. The OCO 618 may include a primary role associated with the executable signal node 602 whereas the ICO 620 may include a secondary role associated with the executable signal node 604. The primary role may be indicative of a capacity in which the executable signal node 602 is associated with the executable signal node 604. The secondary role may be indicative of a capacity in which the executable signal node 604 is associated with the executable signal node 602. The primary role and the secondary role may be complementary. In other words, the primary role and the secondary role, collectively, are indicative of a mutual relationship/association between the executable signal nodes 602 and 604. In an example, the executable signal node 602 may represent a 'manager' of a team whereas the executable signal node 604 may represent an 'associate' working under the manager of the team. In such an example, the primary role may be 'manager' and the secondary role may be 'associate'. Hence, the connection link 616 may indicate that the mutual association between the signal nodes 602 and 604 may be of a manager and associate.

In some embodiments, the connection link 616 may be realized as a signal node with role node-type. In such embodiments, the OCO 618 and the ICO 620 may also be associated with corresponding signal overlay nodes. As shown, the OCO 618 is associated with a signal overlay node 622 and the ICO 620 is associated with the other signal overlay node 624. Throughout the description, an OCO is depicted by way of a half-moon associated with a solid line, and an ICO is depicted by way of an oval arrow. In addition, the half-moon enclosed within a circle indicates that the OCO may be associated with an overlay (for example, a generic overlay node or a signal overlay node). An oval arrow-head of the oval arrow enclosed within a circle indicates that the ICO may be associated with an overlay node (for example, a generic overlay node or a signal overlay node).

In operation, the executable signal node 602 may receive an input signal from a first set of signal nodes (not shown) at an inward group object 626. An inward group object is a logical part of an associated signal node that receives inputs via ICOs of one or more connection links associated therewith. The inward group object 626 may be a convergence point for one or more ICOs of various connection links associated with the executable signal node 602. In an instance, the inward group object 626 may forward the received inputs separately to the executable signal node 602. In another instance, the inward group object 626 may forward the received input signals as a combined input signal to the executable signal node 602.

In some embodiments, the inward group object 626 may be associated with one or more signal overlay nodes. In such embodiments, functionalities of the one or more signal overlay nodes may be executed on the received input signals. Subsequently, an output signal of the execution may be provided to the executable signal node 602 as input.

In other embodiments, one or more connection links that provide input to the executable signal node 602 may be directly associated with the executable signal node 602. In other words, the one or more connection links that provide the input to the executable signal node 602 may be associated with the executable signal node 602 without being associated with the inward group object 626. In such embodiments, the functionalities of the one or more signal overlay nodes associated with the inward group object 626 may not be executed on the input.

The input received by the executable signal node 602 may act as a stimulus (for example, the stimulus 230). Based on the stimulus, the processing circuitry (for example, the controller module 206, the transaction module 208, or the like) may be configured to identify the executable signal node 602. Further, the processing circuitry (for example, the controller module 206, the transaction module 208, or the like) may be configured to identify the signal overlay nodes 610, 612, and 614 associated with the executable signal node

602. The processing circuitry (for example, the controller module 206, the transaction module 208, or the like) may be further configured to generate a first signal based on a signal associated with the stimulus. The processing circuitry (for example, the controller module 206, the transaction module 208, or the like) may be further configured to generate the first signal based on an integration of a signal potential of the signal associated with the stimulus with a signal potential of a current signal of the executable signal node 602. The processing circuitry (for example, the controller module 206, the transaction module 208, or the like) may be further configured to integrate the signal potential of the signal associated with the stimulus with the signal potential of the current signal of the executable signal node 602 based on a convolution function associated with the executable signal node 602. In an embodiment, processing logic associated with overlays of an executable signal node may be executed with a bottom-up approach such that the processing logic of a child overlay node may be executed prior to the execution of processing logic associated with a parent overlay node. Therefore, the processing logic of the signal overlay node 614 is executed prior to the processing logic associated with the signal overlay node 612.

The first signal may have to be communicated to the executable signal node 604 for further execution of an operation associated with the stimulus. Notably, for the communication of the first signal to the executable signal node 604, the processing circuitry (for example, the controller module 206, the transaction module 208, or the like) may determine a signal potential of the first signal. Subsequently, the processing circuitry (for example, the controller module 206, the transaction module 208, or the like) may determine whether the signal potential of the first signal exceeds a potential threshold associated with the executable signal node 602. Based on the signal potential of the first signal exceeding the potential threshold, the processing circuitry (for example, the controller module 206, the transaction module 208, or the like) may communicate the first signal to the executable signal node 604.

For communication of the first signal to the executable signal node 604, the first signal passes through an outward group object 628 associated with the executable signal node 602. An outward group object is a logical part of an associated signal node that communicates a signal via outward connection objects of one or more connection links associated therewith. The outward group object 628 may be a divergence point for one or more OCOs of various connection links associated with the executable signal node 602. Notably, the first signal being communicated via the outward group object 628 may be communicated to each signal node that may be associated with the executable signal node 602 via connection links with corresponding OCOs diverging from the outward group object 628. For example, the connection link 616 and a connection link 630 may diverge from the outward group object 628. The connection link 630 may associate the executable signal node 602 to the signal node 606 such that the executable signal node 602 may communicate one or more signals to the signal node 606.

At the outward group object 628, the processing circuitry (for example, the controller module 206, the transaction module 208, or the like) may identify the signal overlay node 614 associated with the outward group object 628. The processing circuitry (for example, the controller module 206, the transaction module 208, or the like) may execute the processing logic associated with the signal overlay node 614 on the first signal. The first signal may be re-generated/ modified based on the execution of the processing logic. Subsequently, the first signal may be communicated to the signal nodes 604 and 606 via the connection links 616 and 630, respectively. While being communicated to the executable signal node 604, the first signal passes through the OCO 618.

At the OCO 618, the processing circuitry (for example, the controller module 206, the transaction module 208, or the like) may identify the signal overlay node 622 associated with the OCO 618. The processing circuitry (for example, the controller module 206, the transaction module 208, or the like) may execute processing logic associated with the signal overlay node 622 on the first signal received from the outward group object 628. Subsequently, the first signal passes through the ICO 620. At the ICO 620, the processing circuitry (for example, the controller module 206, the transaction module 208, or the like) may identify the signal overlay node 624 associated with the ICO 620. The processing circuitry (for example, the controller module 206, the transaction module 208, or the like) may execute processing logic associated with the signal overlay node 624 on the first signal received from the OCO 618. Based on the execution, the first signal is modified/re-generated. For the sake of brevity, it is assumed that the overlay nodes 622 and 624 associated with the OCO 618 and the ICO 620, respectively, are signal overlay nodes. In other embodiments, the overlay nodes 622 and 624 may be generic overlay nodes.

Subsequently, the first signal is communicated to an inward group object 632. The inward group object 632 is a convergence point associated with the executable signal node 604 for receiving inputs from the executable signal node 602 and the signal node 608. At the inward group object 632, the processing circuitry (for example, the controller module 206, the transaction module 208, or the like) may identify a signal overlay node 634 associated with the inward group object 632. The processing circuitry (for example, the controller module 206, the transaction module 208, or the like) may execute processing logic associated with the signal overlay node 634 of the inward group object 632 on the first signal received from the ICO 620. Subsequently, the first signal may be communicated to the executable signal node 604.

At the executable signal node 604, the processing circuitry (for example, the controller module 206, the transaction module 208, or the like) may identify a signal overlay node 636 associated with the executable signal node 604. The processing circuitry (for example, the controller module 206, the transaction module 208, or the like) may execute processing logic associated with the signal overlay node 636 of the executable signal node 604 on the first signal. Based on the execution of the processing logic associated with the signal overlay node 636, the processing circuitry (for example, the controller module 206, the transaction module 208, or the like) may generate a second signal. The second signal may be an integration of the signal potential of the first signal and signal potentials of other signals received by the executable signal node 604 before the first signal, in accordance with a convolution function associated with the executable signal node 604. The processing circuitry (for example, the controller module 206, the transaction module 208, or the like) may communicate the second signal to a signal node (not shown), communicatively coupled to the executable signal node 604, based on a signal potential of the second signal being greater than a potential threshold associated with the executable signal node 604.

The executable signal node 604 may further receive a third signal from the signal node 608 via a connection link having an OCO 638 and an ICO 640. The ICO 640 is associated with the executable signal node 604 by way of the inward group object 632 whereas the OCO 638 is associated with the signal node 608. The third signal and the first signal may be received by the executable signal node 604 in an order of arrival. In some embodiments, the first and third signals may be combined based on the execution of processing logic associated with the signal overlay node 634 and the combined signal may be received by the executable signal node 604.

It will be apparent to a person skilled in the art that a signal being communicated between two signal nodes (for example, the signal nodes 602 and 604) passes through various junctures (for example, the executable signal node 602, the outward group object 628, the OCO 618, the ICO 620, the inward group object 632, and the executable signal node 604) in a sequential manner. At each juncture, in case one or more associated signal overlay nodes are present, processing logic of the signal overlay node is executed on the signal and a modified signal is communicated to a next juncture.

It will be appreciated by a person skilled in the art that a signal is modified or re-generated based on one or more modifications made to one or more parameters associated with the signal. The parameters may include an amplitude, a frequency, a phase, polarity, sampling rate, resolution, energy, and signal-to-noise ratio, of the signal. The parameters may be modified based on various logical operations, Boolean operations, mathematical operations, or the like. Notably, a signal overlay node may modify a signal by executing a time shift operation, a time scale operation, a correlation operation, an integration operation, a Boolean operation, or a statistical operation.

For the sake of brevity, FIG. 6 depicts signal overlay nodes associated with each of the executable signal node 602, the outward group object 628, the OCO 618, the ICO 620, the inward group object 632, and the executable signal node 604. In other embodiments, each of the executable signal node 602, the outward group object 628, the OCO 618, the ICO 620, the inward group object 632, and the executable signal node 604 may be associated with one or more generic overlay nodes. A generic overlay node may perform one or more operations on the signal without modifying the signal. For example, processing logic associated with an encryption overlay node may encrypt the signal.

For the sake of brevity, FIG. 6 depicts signal overlay nodes associated with each of the executable signal node 602, the outward group object 628, the OCO 618, the ICO 620, the inward group object 632, and the executable signal node 604. In other embodiments, one or more of the executable signal node 602, the outward group object 628, the OCO 618, the ICO 620, the inward group object 632, and the executable signal node 604 may not be associated with any overlay node. Hence, the regeneration/modification of the first signal may not take place in the absence of the signal overlay node.

It will be apparent to a person skilled in the art that the operation associated with the stimulus 230 may be executed further based on the signal node 606 and/or the signal node 608 without deviating from the scope of the disclosure.

Although not shown, the executable signal node 604 may have an outward group object via which the executable signal node 604 may be associated with two or more signal nodes. In some embodiments, the processing circuitry (for example, the controller module 206 and the transaction module 208) may execute the operation associated with the stimulus further based on the two or more signal nodes associated with the executable signal node 604 via the outward group object. The executable signal node 604 may communicate with the two or more signal nodes via the outward group object.

For the sake of brevity, the connection link 616 is assumed to be a signal node with the role node-type. In other embodiments, the connection link 616 may be implemented as roles that are integral to the executable signal nodes 602 and 604 which are edge node-types. In other words, the primary role may be realized as integral to the executable signal node 602 and the secondary role may be realized as integral to the executable signal node 604 without deviating from the scope of the disclosure. In such embodiments, the OCO 618 and the ICO 620 of the connection link 616 may not be associated with any overlay nodes.

It will be apparent to a person skilled in the art that operations being performed by a node of the executable graph-based model 100 are realized by the processing circuitry (for example, the controller module 206, the transaction module 208, or any other component of the overlay system 202) while using relevant nodes.

For the sake of brevity, a single communication link (for example, the connection link 616) is shown between the executable signal nodes 602 and 604. The connection link 616 allows the executable signal node 602 to communicate with the executable signal node 604. For the executable signal node 604 to be able to communicate with the executable signal node 602, another communication link (not shown) may be instantiated between the executable signal nodes 602 and 604 such that an ICO may be associated with the executable signal node 602 and an OCO may be associated with the executable signal node 604.

It will be apparent to a person skilled in the art that the executable signal nodes 602 and 604 may be further associated with one or more generic nodes. In such a scenario, the transaction associated with the stimulus may be executed further based on the one or more generic nodes.

Figure 7A:
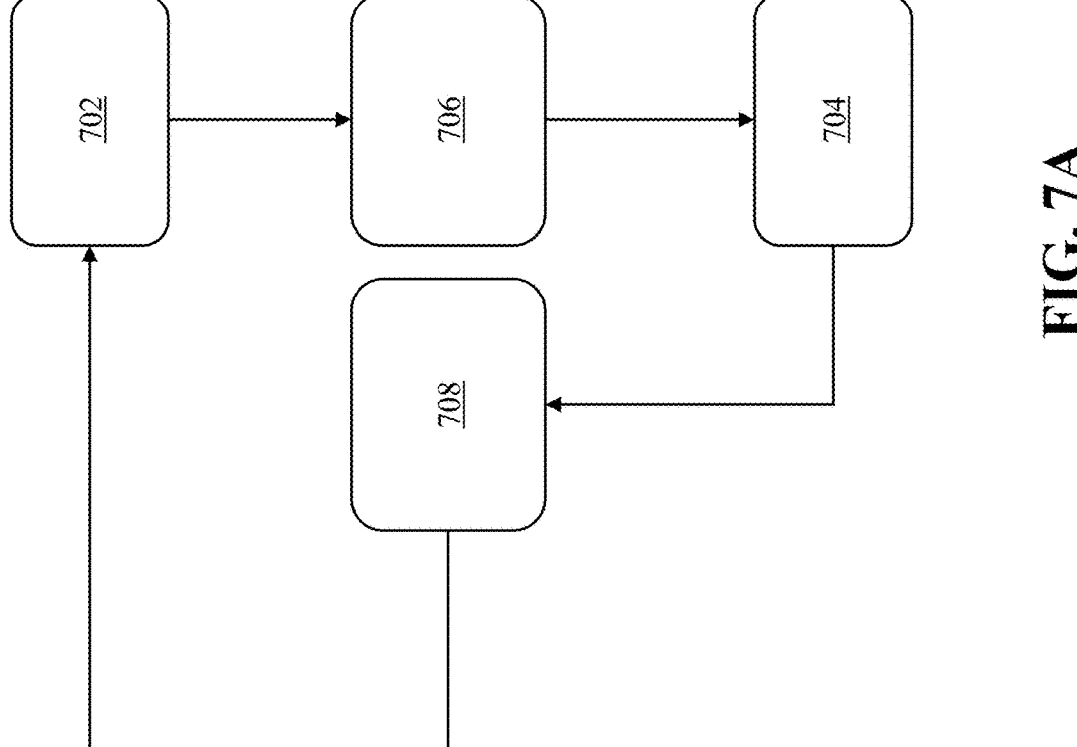
FIGS. 7A and 7B are block diagrams that, collectively, illustrate a process of loading signal nodes, consistent with disclosed embodiments of the present disclosure.
Figure 7A:
Figure 7B:
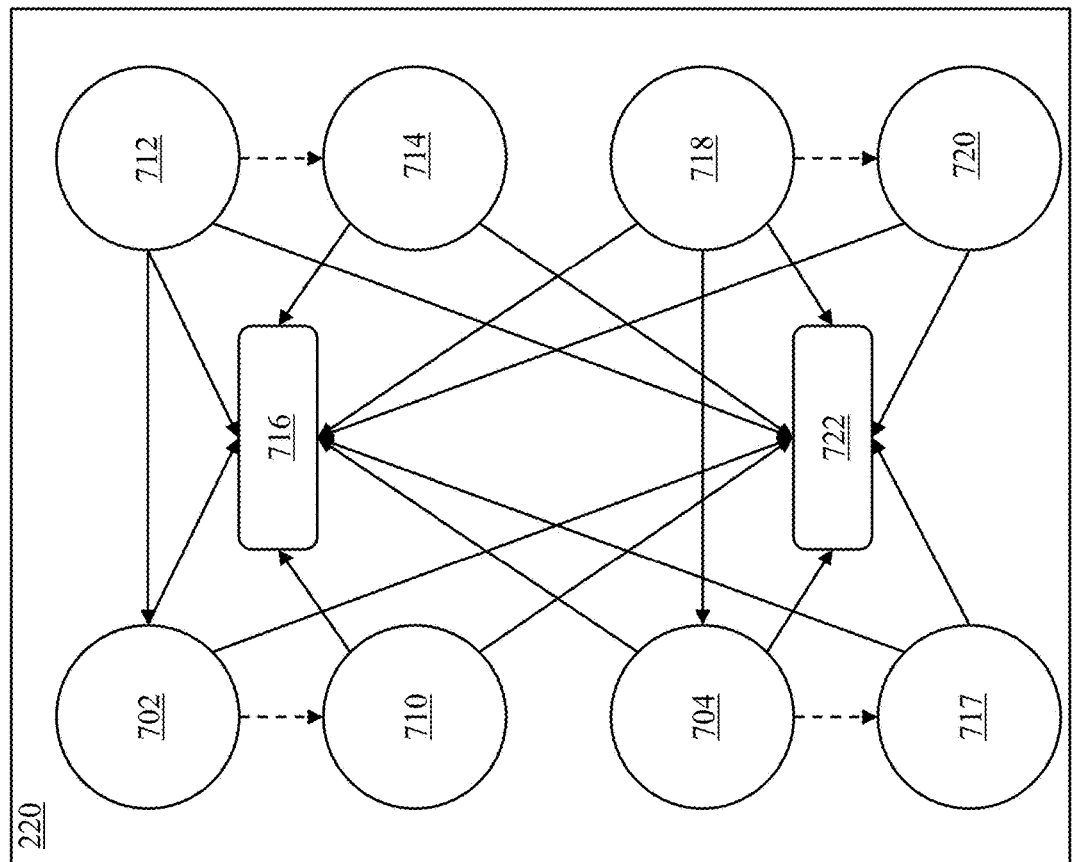

To summarize, FIG. 6 describes an operation associated with stimulus processing using the signal nodes in the executable graph-based model 100. As mentioned earlier, prior to the execution of the operation associated with the stimulus, relevant nodes are required to be loaded in the executable graph-based model 100. FIGS. 7A and 7B, collectively, illustrate a process of loading of signal nodes required for processing of the stimulus (for example, the stimulus 230).

FIGS. 7A and 7B are block diagrams 700A and 700B that, collectively, illustrate a process of loading signal nodes, consistent with disclosed embodiments of the present disclosure. Referring to FIG. 7A, shown are signal nodes 702 and 704 coupled by way of a connection link 706 that enables the signal node 702 to transmit signals to the signal node 704. The signal nodes 702 and 704 are further associated with a connection link 708 that enables the signal node 704 to transmit signals to the signal node 702. In an instance, when the signal nodes 702 and 704 may not be used by the processing circuitry (for example, the controller module 206 and the transaction module 208) for any operation associated with the overlay system 202, the signal nodes 702 and 704 may be unloaded from the executable graph-based model 100. In a subsequent instance, the processing circuitry (for example, the controller module 206 and the transaction module 208) may require the use of the signal node 702. Therefore, the processing circuitry may load the signal node 702. Based on the association with the signal node 702, the signal node 704 may also be loaded in the executable graph-based model 100.

Referring to FIG. 7B, shown is the storage management module 220 of the overlay system 202 that along with the processing logic (for example, the controller module 206 and the transaction module 208) and the memory management module 218 manage storage, loading, and unloading of the signal nodes of the executable graph-based model 100. As shown, the signal node 702 has a signal node state 710. The signal node state 710 has a signal node manifest 712 that has a signal node manifest state 714. The signal node state 710 has a description that is similar to the second state 506 of the base node 302 of FIG. 5. The signal node manifest 712 has a description that is similar to the second manifest 516 of FIG. 5. The signal node manifest state 714 has a description that is similar to the description of the manifest state of the second manifest 516 of FIG. 5. In addition, the signal node 702, the signal node state 710, the signal node manifest 712, and the signal node manifest state 714 are associated with an identifier 716.

Similarly, the signal node 704 has a signal node state 717. The signal node state 717 has a signal node manifest 718 that has a signal node manifest state 720. The signal node state 717 has a description that is similar to the second state 506 of the base node 302 of FIG. 5. The signal node manifest 718 has a description that is similar to the second manifest 516 of FIG. 5. The signal node manifest state 720 has a description that is similar to the description of the manifest state of the second manifest 516 of FIG. 5. In addition, the signal node 704, the signal node state 717, the signal node manifest 718, and the signal node manifest state 720 are associated with an identifier 722.

Notably, the signal node 702, the signal node state 710, the signal node manifest 712, and the signal node manifest state 714 are associated with the identifier 722. In addition, the signal node 704, the signal node state 717, the signal node manifest 718, and the signal node manifest state 720 are associated with the identifier 716.

It will be apparent to a person skilled in the art that a signal node may be loaded in a manner that is similar to the loading of the base node 302. Notably, an executable signal node may be loaded in a manner that is similar to the loading of the executable generic node 402.

While loading the signal node 702, the processing logic (for example, the controller module 206 and the transaction module 208) may determine the identifier 722 associated with the signal node 702. Based on the determination of the identifier 722, the processing logic (for example, the controller module 206 and the transaction module 208) may further load the signal node 704 in a manner that is similar to the loading of the signal node 702. Similarly, in other embodiments, while loading the signal node 704, the processing circuitry (for example, the memory management module 218 and the storage management module 220) may load the signal node 702.

To summarize, based on reception of a stimulus associated with the signal node 702, the signal node 702, the connection link 706, the signal node 704, and overlay nodes associated with them may be loaded.

It will be apparent to a person skilled in the art that based on the connection link 708 connecting the signal node 704 to the signal node 702, the signal node 702 may be loaded in an instance when the signal node 704 is loaded.

In some embodiments, a signal node may inherit data and processing logic associated with one or more generic nodes or one or more signal nodes. Based on a loading of the signal node, the one or more generic nodes or one or more signal nodes may also be loaded.

In some embodiments, a signal node may have a dependency with one or more generic nodes or the one or more signal nodes. Based on a loading of the signal node, the one or more generic nodes or one or more signal nodes may also be loaded.

In some embodiments, a signal node may be associated with a signal overlay node via a connection link. Based on a loading of the signal node, the signal overlay node may also be loaded.

In some embodiments, when the execution of the stimulus processing of the stimulus is completed, the signal nodes 702 and 704, the connection link 706, and overlay nodes associated therewith may be unloaded.

In some embodiments, a signal node may inherit data and processing logic associated with one or more generic nodes or one or more signal nodes. Based on an unloading of the signal node, the one or more generic nodes or one or more signal nodes may also be unloaded.

In some embodiments, a signal node may have a dependency with one or more generic nodes or the one or more signal nodes. Based on an unloading of the signal node, the one or more generic nodes or one or more signal nodes may also be unloaded.

In some embodiments, a signal node may be associated with a signal overlay node via a connection link. Based on an unloading of the signal node, the signal overlay node may also be unloaded.

In some embodiments, the signal node 702 may have the share-shared dependency with the signal node 704. The signal node 704 may have a list with entries of signal nodes currently using data and processing logic associated therewith. In such embodiments, in case a count of entries in the list is non-zero, the signal node 704 may not be unloaded based on an unloading of the signal node 702.

Having discussed the primary features of signal nodes, the description now moves towards the discussion of additional features associated with the signal nodes in the executable graph-based model 100.

Figures 8A, 8B:
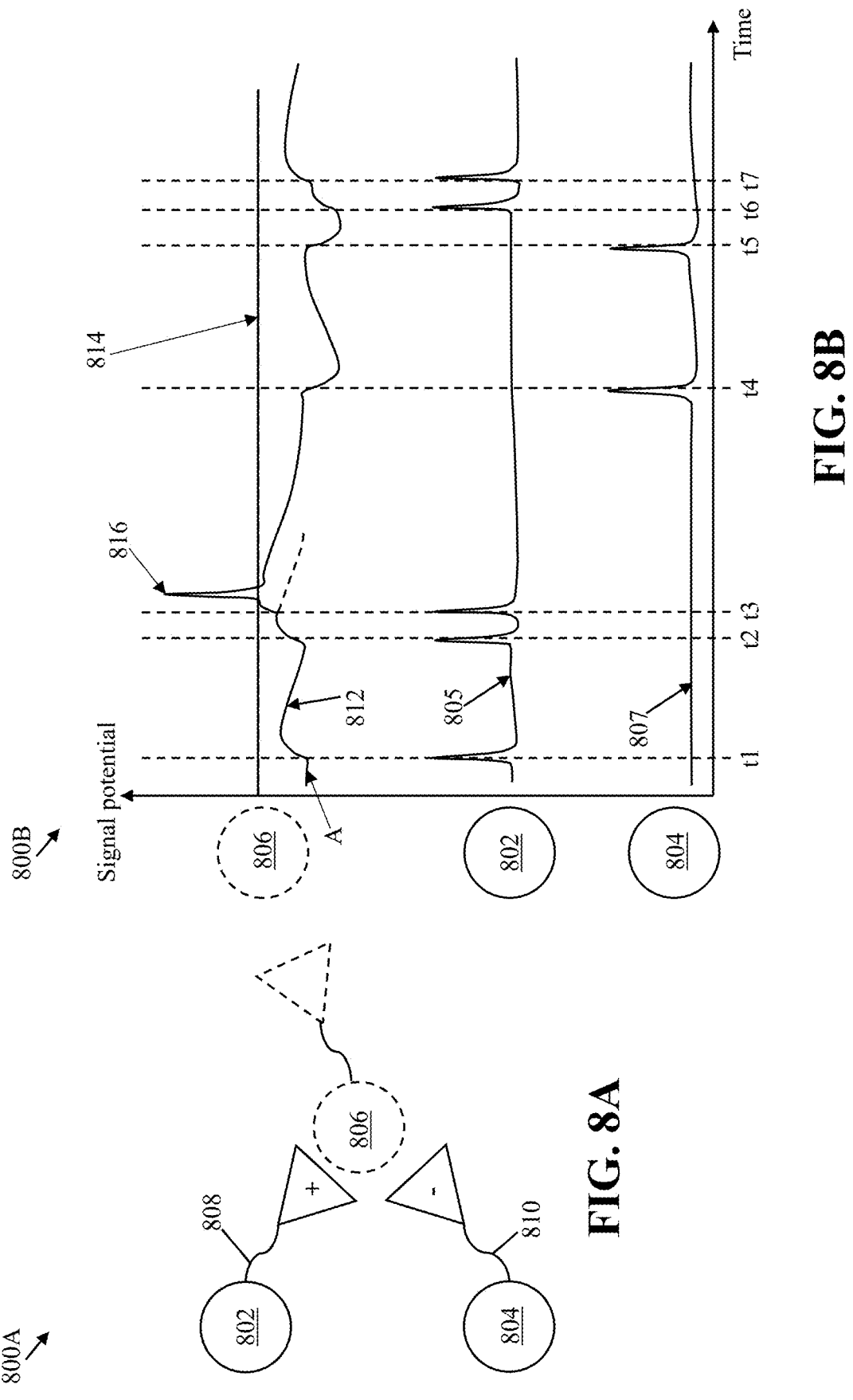
FIGS. 8A and 8B, collectively, illustrate schematic diagrams that depict signal propagation among signal nodes, consistent with disclosed embodiments of the present disclosure.

FIGS. 8A and 8B, collectively, illustrate schematic diagrams 800A and 800B that depict signal propagation among signal nodes, consistent with disclosed embodiments of the present disclosure. Referring to FIG. 8A, depicted are signal nodes 802, 804, and 806 such that the signal nodes 802 and 804 communicate a signal 805 and a signal 807, respectively, to the signal node 806. A connection link 808 couples the signal node 802 with the signal node 806 and another connection link 810 couples the signal node 804 with the signal node 806. FIG. 8A depicts the connection links 808 and 810 by way of triangles associated with tails such that the tails represent OCOs and the triangles represent ICOs. Further, a positive sign (+) within the triangle representing the ICO of the connection link 808 indicates that the signal node 802 communicates an excitation signal to the signal node 806. That is to say that the signal 805 is an excitation signal. Additionally, a negative sign (−) within the triangle representing the ICO of the connection link 810 indicates that the signal node 804 communicates an inhibition signal to the signal node 806. That is to say that the signal 807 is an inhibition signal.

Referring now to FIG. 8B, shown is a signal potential versus time graph that describes the generation of a signal 812 by the signal node 806 based on the signals 805 and 807 received from the signal nodes 802 and 804. The signal potential versus time graph indicates the signal potential on y-axis and the time on x-axis. As shown, at time instance t1, a signal potential of the signal 812 associated with the signal node 806 is less than a potential threshold 814 associated with the signal node 806. Additionally, at the time instance t1, the signal 812 is shown to be at a resting potential A. A resting potential refers to a signal potential of a signal generated by a signal node when not affected by any external signal. Further, at the time instance t1, the signal node 802 may communicate a first excitation signal to the signal node 806. The first excitation signal may be the signal 805 in an excitation (+) state. Based on the received first excitation signal, the signal potential of the signal 812 rises (as shown between the time instance t1 and a subsequent time instance t2). However, the signal potential of the signal 812 remains below the potential threshold 814. Subsequently, the signal 812 starts decaying in accordance with a decay function associated with the signal node 806.

At the time instance t2, the signal node 802 may communicate a second excitation signal to the signal node 806. The second excitation signal may be the signal 805 in the excitation (+) state. Based on the received second excitation signal, the signal potential of the signal 812 rises (as shown between the time instance t2 and a subsequent time instance t3). However, the signal potential of the signal 812 remains below the potential threshold 814. At the time instance t3, the signal node 802 may communicate a third excitation signal to the signal node 806. The third excitation signal may be the signal 805 in the excitation (+) state. In an instance, when the signal node 802 may have not communicated the third excitation signal, the signal potential of the signal 812 may have started to decay (shown by way of a dotted curve) as described previously in association with the reception of the first excitation signal. However, based on the received third excitation signal, the signal potential of the signal 812 becomes an integration of signal potentials of the second and third excitation signals in accordance with a convolution function of the signal node 806. Consequently, the signal potential of the signal 812 rises (shown by arrow 816 in FIG. 8B) to exceed the potential threshold 814. Based on the signal potential of the signal 812 exceeding the potential threshold, the signal node 806 may generate an excitation signal that may be communicated to a signal node (not shown) associated with the signal node 806. Subsequently, the signal potential of the signal 812 starts to decay (as shown between the time instance t3 and the subsequent time instance t4).

At the time instance t4, the signal node 804 communicates a first inhibition signal to the signal node 806. The first inhibition signal may be the signal 807 in an inhibited (−) state. Based on the inhibition signal, the signal 812 dips in accordance with a signal potential of the first inhibition signal. Notably, the decay function associated with the signal node 806 causes the signal node 806 to change the signal potential of the signal 812 to reach the resting potential A. Therefore, the signal 812 exhibits a rise in its signal potential to reach the resting potential A. Such a rise in the signal potential may be referred to as an inverse decay of the signal potential (as shown between the time instance t4 and a subsequent time instance t5). The inverse decay of the signal 812 is caused in conformity with the decay function associated with the signal node 806. Subsequently, at the time instance t5, the signal node 804 communicates a second inhibition signal to the signal node 806. The second inhibition signal may be the signal 807 in the inhibited (−) state. As shown between the time instance t5 and a subsequent time instance t6, the signal potential of the signal 812 dips in accordance with a signal potential of the second inhibition signal. Again, the signal potential of the signal 812 goes through the inverse decay in accordance with the decay function associated with the signal node 806. At the time instance t6, the signal node 802 communicates a fourth excitation signal to the signal node 806. The fourth excitation signal may be the signal 805 in the excitation (+) state. As shown between the time instance t6 and a subsequent time instance t7, the signal potential of the signal 812 increases. The increase in the signal potential of the signal 812 is equal to an integration of the signal potential of the second inhibition signal and the fourth excitation signal in accordance with the convolution function of the signal node 806. Subsequently, at the time instance t7, the signal node 802 communicates a fifth excitation signal to the signal node 806. The fifth excitation signal may be the signal 805 in the excitation (+) state. Based on the fifth excitation signal, the signal potential of the signal 812 increases. The increase in the signal potential at the time instance t7 may be equal to an integration of a signal potential of the fifth excitation signal and a current signal potential of the signal 812 in accordance with the convolution function of the signal node 806. Subsequently, the signal potential of the signal 812 starts to decay in accordance with the decay function of the signal node 806.

For the sake of brevity, a signal type of the signal node 806 is assumed to be the excitation signal type. Hence, the potential threshold 814 is assumed to be a positive value of signal potential. In some embodiments, the signal type of the signal node 806 may be the inhibition signal type. In such embodiments, the potential threshold 814 may be a negative value of signal potential.

FIGS. 8A and 8B depict generation of signals and interaction of signals. To summarize, a signal potential of a new signal received by a signal node is integrated into a current signal potential of a signal being generated by the signal node in accordance with a convolution function of the signal node. The received signal and the generated signal may be an excitation signal or an inhibition signal. Hence, an integration of signal potentials of the received signal and the generated signal may cause a current signal potential of the generated signal to increase or decrease. For example, when the received signal is an inhibition signal, the current signal potential may decrease. On the contrary, when the received signal is an excitation signal, the current signal potential may increase. The above-described concepts associated with the signal nodes and signals generated by the signal nodes allow the overlay system 202 to facilitate the creation of various micro-networks and the execution of operations associated with the micro-networks.

Figure 9A:
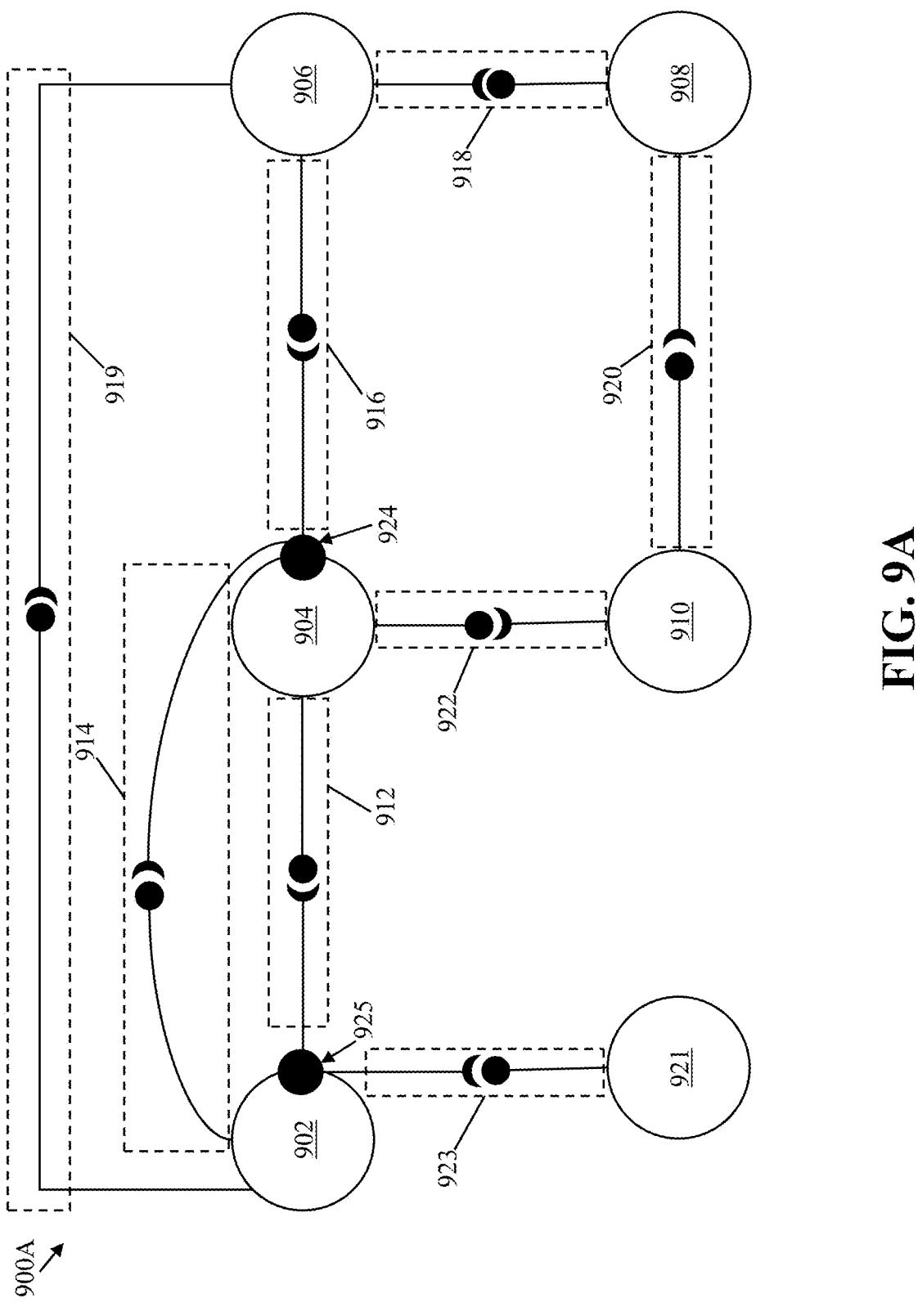
FIGS. 9A-9C illustrate graphs that depict various micro-networks implemented using signal nodes in the executable graph-based model, consistent with disclosed embodiments of the present disclosure.
Figures 9B, 9C:
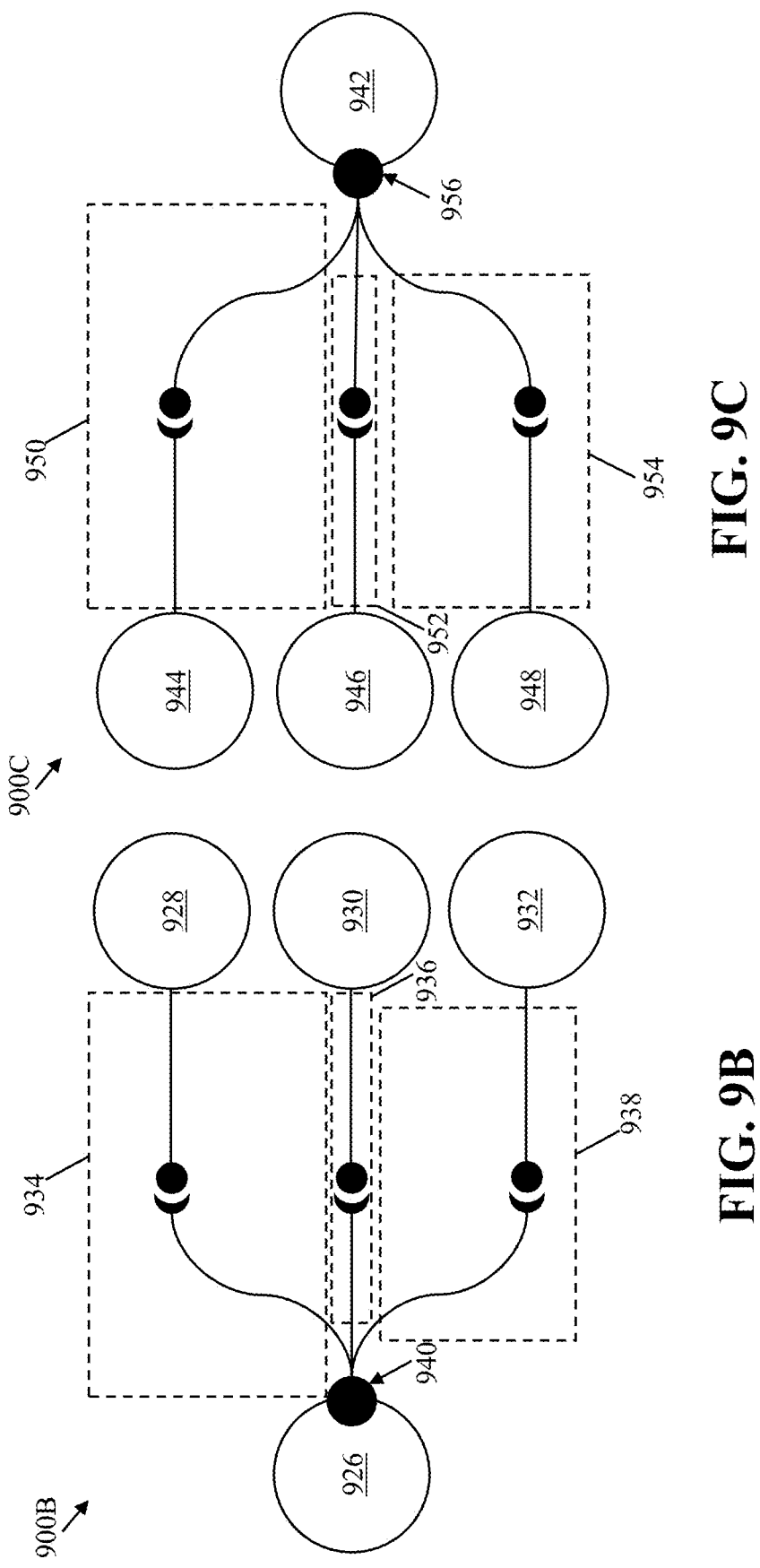

FIGS. 9A-9C illustrate graphs 900A-900C that depict various micro-networks implemented using signal nodes in the executable graph-based model 100, consistent with disclosed embodiments of the present disclosure.

Referring to FIG. 9A, illustrated is a micro-network that includes signal nodes 902-910. As shown, the signal node 902 is associated with the signal node 904 by way of a connection link 912 such that an OCO of the connection link 912 is associated with the signal node 902 and an ICO of the connection link 912 is associated with the signal node 904. The signal nodes 904 and 902 are also associated with each other by way of another connection link 914 such that an OCO of the connection link 914 is associated with the signal node 904 and an ICO of the connection link is associated with the signal node 902. Such association of the signal nodes 902 and 904 by way of the connection links 912 and 914 forms a loop, a feedback micro-network, and a back-propagation micro-network. The signal node 904 is further associated with the signal node 906 by way of a connection link 916 such that an OCO thereof is associated with the signal node 904 and the ICO thereof is associated with the signal node 906. The association of the signal nodes 902 and 904 by way of the connection link 912 and the association of the signal nodes 904 and 906 by way of the connection link 916 forms a feedforward micro-network.

As shown, the signal node 906 is further associated with the signal node 908 by way of a connection link 918 such that an OCO thereof is associated with the signal node 906 and the ICO thereof is associated with the signal node 908. Further, the signal node 908 is associated with the signal node 910 by way of a connection link 920 such that an OCO thereof is associated with the signal node 908 and the ICO thereof is associated with the signal node 910. Further, the signal node 910 is associated with the signal node 904 by way of a connection link 922 such that an OCO thereof is associated with the signal node 910 and the ICO thereof is associated with the signal node 904. Such an association of the signal nodes 904-910 may form a recurrent micro-network.

In operation, the signal node 902 may receive a stimulus. The processing circuitry (for example, the controller module 206 and the transaction module 208) may be configured to identify the signal node 902 based on the stimulus. The signal node 902 may generate a sixth signal based on the stimulus. The processing circuitry (for example, the controller module 206 and the transaction module 208) may be further configured to determine whether a signal potential of the sixth signal exceeds a potential threshold associated with the signal node 902. Subsequently, based on the signal potential of the sixth signal exceeding the potential threshold associated with the signal node 902, the processing circuitry (for example, the controller module 206 and the transaction module 208) may be configured to identify the signal node 904 based on the connection link 912 associated with the signal node 902. Subsequently, the signal node 902 may communicate the sixth signal (for example, an excitation signal or an inhibition signal) to the signal node 904. Notably, the signal node 902 may communicate the sixth signal to the signal node 904 via the connection link 912. The sixth signal may be communicated to the signal node 904 based on the signal potential of the sixth signal being greater than the potential threshold of the signal node 902. Subsequently, at the signal node 904, the signal potential of the sixth signal gets integrated into a current signal potential of a signal associated with the signal node 904 to generate a seventh signal in accordance with a convolution function of the signal node 904. The current signal potential refers to a signal potential of the signal of the signal node 904 at a current time-instance such that the sixth signal potential is received at the current time-instance. As shown, the OCOs of the connection links 914 and 916 are associated with the signal node 904 by way of an outward group object 924. Therefore, based on a signal potential of the seventh signal being greater than a potential threshold of the signal node 904, the seventh signal gets communicated to the signal node 906 as well as to the signal node 902 as feedback. The seventh signal may be communicated to the signal nodes 902 and 906 via the connection links 914 and 916, respectively.

At the signal node 906, the signal potential of the seventh signal gets integrated, in accordance with a convolution function of the signal node 906, to a current signal potential of a signal associated with the signal node 906 to generate an eighth signal. Based on a signal potential of the eighth signal being greater than a potential threshold of the signal node 906, the eighth signal is communicated to the signal node 908. The eighth signal may be communicated to the signal node 908 via the connection link 918. As shown, the signal node 906 is further associated with the signal node 902 via a connection link 919 such that an OCO of the connection link 919 is associated with the signal node 906 and an ICO of the connection link 919 is associated with the signal node 902. Therefore, based on the signal potential of the eighth signal being greater than the potential threshold of the signal node 906, the eighth signal is communicated to the signal node 902 via the connection link 919.

At the signal node 908, the signal potential of the eighth signal is integrated, in accordance with a convolution function of the signal node 908, to a current signal potential of a signal associated with the signal node 908 to generate a ninth signal. Based on a signal potential of the ninth signal being greater than a potential threshold of the signal node 908, the ninth signal gets communicated to the signal node 910. The ninth signal may be communicated to the signal node 910 via the connection link 920. At the signal node 910, the signal potential of the ninth signal gets integrated, in accordance with a convolution function of the signal node 910, to a current signal potential of a signal associated with the signal node 910 to generate a tenth signal. Based on a signal potential of the tenth signal being greater than a potential threshold of the signal node 910, the tenth signal is communicated to the signal node 904. The tenth signal may be communicated to the signal node 904 via the connection link 922. At the signal node 904, the signal potential of the tenth signal is integrated, in accordance with a convolution function of the signal node 904, to a second current signal potential of the signal associated with the signal node 904 to generate an eleventh signal. Notably, the second current signal potential may be equal to an integrated signal potential of the first current signal potential and the signal potential of the sixth signal when decayed in accordance with a decay function associated with the signal node 904. Based on a signal potential of the eleventh signal being greater than the potential threshold of the signal node 904, the eleventh signal gets communicated to the signal node 902 as the feedback and to the signal node 906 as an input. The eleventh signal may be communicated to the signal node 902 via the connection link 914.

In some embodiments, the signal node 902 may be further associated with a signal node 921 via a connection link 923. An OCO of the connection link 923 may be associated with the signal node 902 and an ICO of the connection link 923 may be associated with the signal node 921. The connection link 923 may be associated with the signal node 902 via an outward group object 925. In such an embodiment, the connection link 912 may also be associated with the signal node 902 via the outward group object 925. Therefore, the sixth signal may be communicated to the signal node 904 via the outward group object 925. Based on the communication of the sixth signal via the outward group object 925, the sixth signal may be further communicated to the signal node 921.

It will be appreciated by a person skilled in the art that the signal node 908 may be associated with the signal nodes 902, 904, or 906 by way of a connection link that has an OCO coupled to the signal node 908 and an ICO coupled with the signal node 902, 904, or 906. Similarly, the signal node 910 may be associated with the signal nodes 902, 906, or 908 by way of a connection link that has an OCO coupled to the signal node 910 and an ICO coupled with the signal node 902, 906, or 908. Such connection links may form various loops, feedback paths, and backpropagation paths.

Referring now to FIG. 9B, illustrated is another micro-network that includes signal nodes 926-932. The signal nodes 926-932 form a micro-network that implements divergence of signals from a signal node.

As shown, the signal node 926 is associated with the signal node 928-932 via connection links 934-938, respectively. The connection link 934 associates (namely, couples) the signal nodes 926 and 928 such that an OCO of the connection link 934 is associated with the signal node 926 and an ICO of the connection link 934 is associated with the signal node 928. Similarly, an OCO of the connection link 936 is associated with the signal node 926 and an ICO of the connection link 936 is associated with the signal node 930. In a similar manner, an OCO of the connection link 938 is associated with the signal node 926 and an ICO of the connection link 938 is associated with the signal node 932. Further, the OCOs of the connection links 934-938 are associated with the signal node 926 via an outward group object 940. Therefore, a signal being communicated via the outward group object 940 may get communicated to each of the signal nodes 928-932.

In operation, the signal node 926 may communicate a twelfth signal (for example, an excitation signal or an inhibition signal). The twelfth signal may be communicated via the outward group object 940. Based on the association of the connection links 934-938 with the outward group object 940, the twelfth signal may be communicated to each of the signal nodes 928-932. In some embodiments, the outward group object 940 may be associated with one or more signal overlay nodes. In such embodiments, the twelfth signal may be re-generated/modified based on an execution of processing logic associated with the signal overlay. Subsequently, the re-generated/modified twelfth signal may be communicated to each of the signal nodes 928-932.

Referring now to FIG. 9C, illustrated is another micro-network that includes signal nodes 942-948. The signal nodes 942-948 form a micro-network to implement the convergence of signals at a signal node.

As shown, the signal node 942 is associated with the signal node 944-948 via connection links 950-954, respectively. The connection link 950 associates (namely, couples) the signal nodes 942 and 944 such that an OCO of the connection link 950 is associated with the signal node 944 and an ICO of the connection link 950 is associated with the signal node 942. Similarly, an OCO of the connection link 952 is associated with the signal node 946 and an ICO of the connection link 952 is associated with the signal node 942. In a similar manner, an OCO of the connection link 954 is associated with the signal node 948 and an ICO of the connection link 954 is associated with the signal node 942. Further, the ICOs of the connection links 950-954 are associated with the signal node 942 via an inward group object 956. Therefore, signals being received by the signal node 942 via the inward group object 956 may get cumulated or collected at the inward group object 956 before reaching the signal node 942.

In operation, the signal nodes 944-948 may communicate fourteenth, fifteenth, and sixteenth signals, respectively, to the signal node 942. The fourteenth, fifteenth, and sixteenth signals may be received at the inward group object 956. At the inward group object 956, the fourteenth, fifteenth, and sixteenth signals may be collected and subsequently received by the signal node 942. In some scenarios, the fourteenth, fifteenth, and sixteenth signals may be received by the signal node 942 separately. The separate reception may be in a predefined order or in an order of reception of the fourteenth, fifteenth, and sixteenth signals.

In some embodiments, the inward group object 956 may be associated with a signal overlay node (not shown). Thus, the fourteenth, fifteenth, and sixteenth signals may be re-generated/modified based on an execution of processing logic associated with the signal overlay node. Subsequently, the re-generated/modified fourteenth, fifteenth, and sixteenth signals may be received by the signal node 942.

It will be appreciated by a person skilled in the art that prior to the execution of the operation associated with the stimulus, the processing circuitry (for example, the controller module 206 and the transaction module 208) may be configured to identify one or more signal nodes associated with the execution of the operation associated with the stimulus. The processing circuitry (for example, the controller module 206 and the transaction module 208) may be further configured to determine whether the one or more signal nodes are loaded in the executable graph-based model 100. Based on at least one of the one or more signal nodes being not loaded in the executable graph-based model 100, the processing circuitry (for example, the controller module 206 and the transaction module 208) may be configured to load the at least one of the one or more signal nodes.

In some embodiments, the processing circuitry (for example, the controller module 206 and the transaction module 208) may be configured to determine whether a signal generated by a signal node exceeds a potential threshold associated with the signal node. Based on the determination that the signal generated by the signal node exceeds the potential threshold associated with the signal node, the processing circuitry (for example, the controller module 206 and the transaction module 208) may be configured to identify a set of signal nodes associated with the signal node. The set of signal nodes may be identified based on the stimulus. Alternatively, the set of signal nodes may be identified based on a set of connection links associated with the signal node. Subsequently, the processing circuitry (for example, the controller module 206 and the transaction module 208) may be configured to communicate the signal to the set of signal nodes via the set of connection links.

It will be apparent to a person skilled in the art that the signal (for example, the excitation signal or the inhibition signal) may have any signal form without deviating from the scope of the disclosure. Examples of the signal form may include, but are not limited to, Sine Wave (Sinusoidal), Square Wave, Triangle Wave, Sawtooth Wave, and Pulse Wave.

It will be appreciated by a person skilled in the art that the micro-networks described in FIGS. 9A-9C may be excitation micro-networks or inhibition micro-networks based on signals generated and communicated within the micro-networks being excitation signals or inhibition signals, respectively.

It will be apparent to a person skilled in the art that any number of signal nodes may be included in a micro-network without deviating from the scope of the disclosure.

It will be apparent to a person skilled in the art that any number of micro-networks may be created using the signal nodes without deviating from the scope of the disclosure.

It will be apparent to a person skilled in the art that the various micro-networks described throughout the description are exemplary and do not limit the scope of the disclosure. Any network design may be implemented using the signal nodes to create other micro-networks without deviating from the scope of the disclosure.

It will be apparent to a person skilled in the art that any number of micro-networks may be formed to implement various logical structures. Such logical structures may be incorporated in executable graph-based models implementing various solutions to achieve specific signals to trigger desired effects. Having discussed a few exemplary micro-networks, the description now moves towards the application of micro-networks formed of one or more signal nodes.

Figure 10:
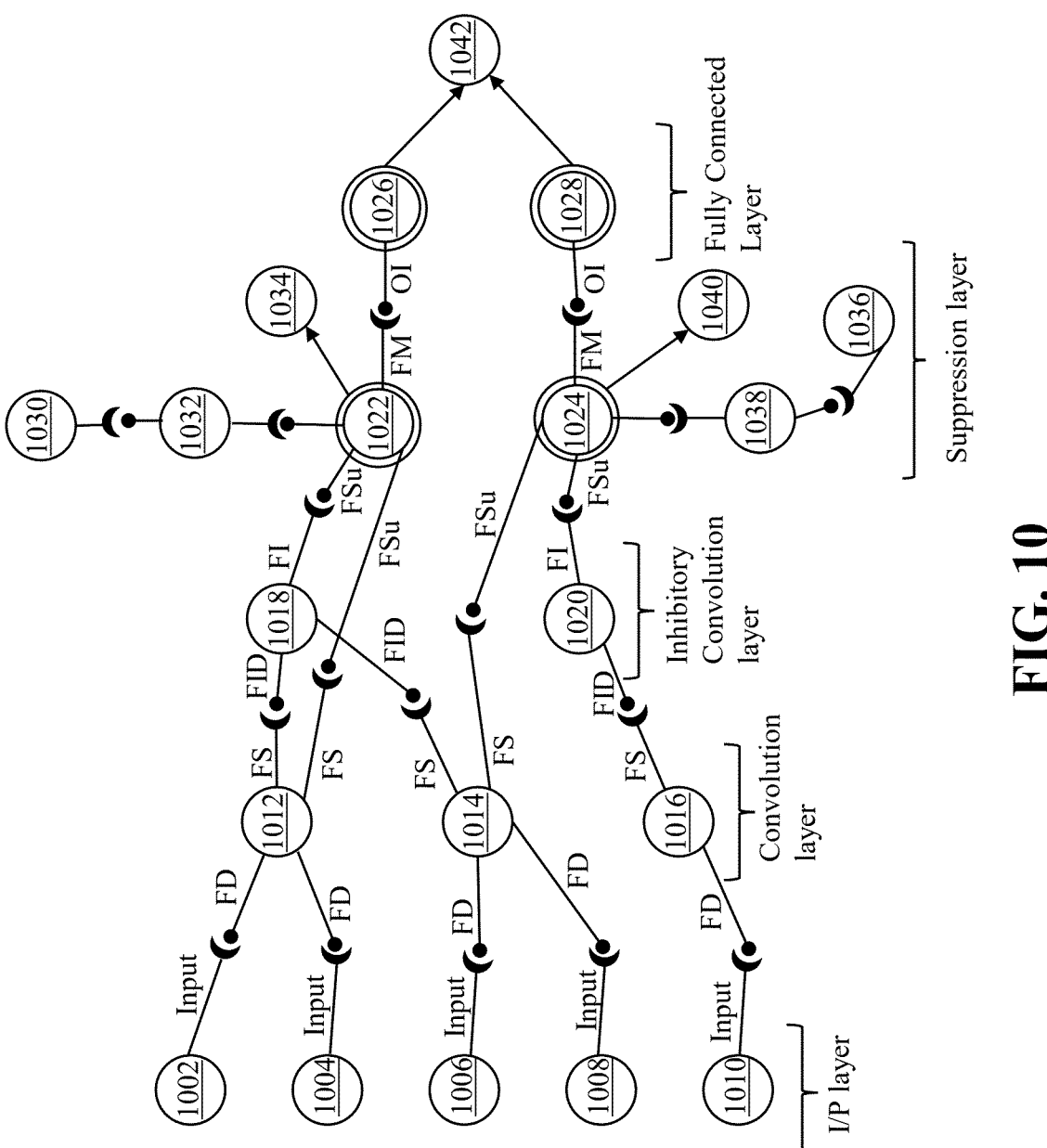
FIG. 10 illustrates a graph of a neural network model for object identification in various images, consistent with disclosed embodiments of the present disclosure.

FIG. 10 illustrates a graph of a neural network model 1000 for object identification in various images, consistent with disclosed embodiments of the present disclosure. The neural network model 1000 is an implementation of the executable graph-based model 100. Referring to FIG. 10A, the neural network model 1000 includes an input layer, a convolution layer, an inhibitory convolution layer, a suppression layer, and a fully connected layer. The input layer includes a plurality of pixel input nodes 1002-1010, the convolution layer includes a plurality of convolution nodes 1012-1016, the inhibitory convolution layer includes a plurality of inhibitory convolution nodes 1018 and 1020, the suppression layer includes a plurality of suppression nodes 1022 and 1024, and the fully connected layer includes a plurality of fully connected nodes 1026 and 1028.

As shown, the pixel input nodes 1002 and 1004 are coupled with the convolution node 1012 by way of corresponding connection links such that OCOs of the connection links are associated with the pixel input nodes 1002 and 1004 and ICOs are associated with the convolution node 1012. The pixel input nodes 1002 and 1004 are associated with a primary role 'Input' and the convolution node 1012 is associated with a secondary role 'Feature Detector (FD)'. Similarly, the pixel input nodes 1006 and 1008 are coupled with the convolution node 1014 by way of corresponding connection links such that OCOs of the connection links are associated with the pixel input nodes 1006 and 1008 and ICOs are associated with the convolution node 1014. The pixel input nodes 1006 and 1008 are associated with a primary role 'Input' and the convolution node 1014 is associated with a secondary role 'FD'. Further, the pixel input node 1010 is coupled with the convolution node 1016 by way of a corresponding connection link such that an OCO of the connection link is associated with the pixel input node 1010 and an ICO of the connection link is associated with the convolution node 1016. The pixel input node 1010 is associated with a primary role 'Input' and the convolution node 1016 is associated with a secondary role 'FD'.

Moreover, the convolution node 1012 is further associated with the inhibitory convolution node 1018 by way of a connection link such that an OCO is associated with the convolution node 1012 and an ICO is associated with the inhibitory convolution node 1018. In addition, the convolution node 1012 is associated with a primary role 'Feature Set' (FS), and the inhibitory convolution node 1018 is associated with a secondary role 'Feature Inhibition Detector' (FID). The convolution node 1012 is also associated with the suppression node 1022 by way of a connection link such that an OCO is associated with the convolution node 1012 and an ICO is associated with the suppression node 1022. In addition, the convolution node 1012 is associated with the primary role 'FS', and the inhibitory convolution node 1018 is associated with a secondary role 'Feature Suppressor' (FSu).

Similarly, the convolution node 1014 is further associated with the inhibitory convolution node 1018 by way of a connection link such that an OCO is associated with the convolution node 1014 and an ICO is associated with the inhibitory convolution node 1018. In addition, the convolution node 1014 is associated with the primary role 'FS', and the inhibitory convolution node 1018 is associated with the secondary role 'FID'. The convolution node 1014 is also associated with the suppression node 1024 by way of a connection link such that an OCO is associated with the convolution node 1014 and an ICO is associated with the suppression node 1024. In addition, the convolution node 1014 is associated with the primary role 'FS', and the suppression node 1024 is associated with the secondary role 'FSu'.

Moreover, the convolution node 1016 is further associated with the inhibitory convolution node 1020 by way of a connection link such that an OCO is associated with the convolution node 1016 and an ICO is associated with the inhibitory convolution node 1020. In addition, the convolution node 1016 is associated with the primary role 'FS', and the inhibitory convolution node 1018 is associated with the secondary role 'FID'.

As shown, the inhibitory convolution node 1018 is associated with the suppression node 1022 by way of a connection link such that an OCO is associated with the inhibitory convolution node 1018 and an ICO is associated with the suppression node 1022. Additionally, the inhibitory convolution node 1018 is associated with a primary role 'Feature to be Inhibited' (FI), and the suppression node 1022 is associated with the secondary role 'FSu'. Similarly, the inhibitory convolution node 1020 is associated with the suppression node 1024 by way of a connection link such that an OCO is associated with the inhibitory convolution node 1020 and an ICO is associated with the suppression node 1024. Additionally, the inhibitory convolution node 1020 is associated with the primary role 'FI', and the suppression node 1024 is associated with the secondary role 'FSu'.

The suppression node 1022 is associated with the fully connected node 1026 by way of a connection link such that an OCO is associated with the suppression node 1022 and an ICO is associated with the fully connected node 1026. Additionally, the suppression node 1022 is associated with a primary role 'Feature Map' (FM), and the fully connected node 1026 is associated with the secondary role 'Object Identifier' (OI). Similarly, the suppression node 1024 is associated with the fully connected node 1028 by way of a connection link such that an OCO is associated with the suppression node 1024 and an ICO is associated with the fully connected node 1028. Additionally, the suppression node 1024 is associated with the primary role 'FM' and the fully connected node 1028 is associated with the secondary role 'Or'.

The plurality of pixel input nodes 1002-1010 may represent a plurality of pixel values of a plurality of pixels that form an image from which one or more objects are to be identified. The plurality of pixel values represented by the plurality of pixel input nodes 1002-1010 may be different for different images. The plurality of convolution nodes 1012-1016 may receive the plurality of pixel values as input and may, collectively, generate a feature set based on the received pixel values. The plurality of convolution nodes 1012-1016 may provide the feature set to the plurality of inhibitory convolution nodes 1018 and 1020 and the plurality of suppression nodes 1022 and 1024. Based on the received feature set, the plurality of inhibitory convolution nodes 1018 and 1020 may generate a subset of features that are to be inhibited. The subset of features that are to be inhibited may correspond to pixel values of portions of the image that may not include the one or more objects depicted in the image. The plurality of inhibitory convolution nodes 1018 and 1020 may provide the subset of features that are to be inhibited to the plurality of suppression nodes 1022 and 1024. Based on the received feature set from the plurality of convolution nodes 1012-1016 and the subset of features that are to be inhibited, the plurality of suppression nodes 1022 and 1024 may suppress, in the feature set, the pixel values that correspond to the subset of features that are to be inhibited. The suppression of the pixel values at the suppression node 1022 may be performed based on an inhibition value generated by a first lateral inhibition micronetwork formed of the suppression node 1022 and signal nodes 1030 and 1032.

The signal node 1032 is a signal node with the excitation signal type and the signal node 1032 is a signal node with the inhibition signal type. The signal node 1030 is associated with the signal node 1032 by way of a connection link such that an OCO is associated with the signal node 1030 and an ICO is associated with the signal node 1032. Further, the signal node 1032 is associated with the suppression node 1022 by way of a connection link such that an OCO is associated with the signal node 1032 and an ICO is associated with the suppression node 1022. The signal node 1030 is in a lateral relation with the suppression node 1022. The signal node 1030 may communicate an excitation signal to the signal node 1032 that may generate an inhibition signal in response. The inhibition signal may be communicated to the suppression node 1022. A signal overlay node 1034 may apply the received inhibition signal on the pixel values to be suppressed, hence, suppressing unwanted portions of the image and enhancing portions of the image that may include the one or more objects. Similarly, the subset of features to be inhibited is suppressed at the suppression node 1024 based on an inhibition value generated by a second lateral inhibition micro-network formed of the suppression node 1024 and the signal nodes 1036 and 1038. A signal overlay node 1040 associated with the suppression node 1024 may apply the received inhibition signal on the pixel values to be suppressed, hence, suppressing unwanted portions of the image and enhancing portions of the image that may include the one or more objects.

Subsequently, the plurality of suppression nodes 1022 and 1024, collectively, communicate a feature map to the plurality of fully connected nodes 1026 and 1028. The plurality of fully connected nodes 1026 and 1028 may perform one or more operations to identify the one or more objects based on the feature map. Notably, the feature map includes features of pixels that may include the one or more objects depicted in the image. Based on object detection performed by the plurality of fully connected nodes 1026 and 1028, a publisher overlay 1042, associated with each of the plurality of fully connected nodes 1026 and 1028, may publish the one or more objects identified in the image.

Beneficially, the use of the micro-networks to inhibit undesired portions and/or enhance desired portions of the image expedites the process of identification of the one or more objects. Hence, the associated processing time, processing complexity, and processing cost are significantly reduced.

It will be appreciated by a person skilled in the art that the plurality of pixel input nodes 1002-1010, the plurality of convolution nodes 1012-1016, the plurality of inhibitory convolution nodes 1018 and 1020, the plurality of suppression nodes 1022 and 1024, and the plurality of fully connected nodes 1026 and 1028 are instantiated in the neural network model 1000 in form of signal nodes. Therefore, operations being performed by way of such signal nodes are based on communication and processing (e.g., modification) of signals (excitation signals or inhibition signals).

For the sake of brevity, the plurality of pixel input nodes 1002-1010, the plurality of convolution nodes 1012-1016, and the plurality of inhibitory convolution nodes 1018 and

1020 are not shown to be associated with any signal overlay node. In practical implementations, the plurality of pixel input nodes 1002-1010, the plurality of convolution nodes 1012-1016, and the plurality of inhibitory convolution nodes 1018 and 1020 may be associated with one or more signal overlay nodes that when executed on a signal may perform a corresponding operation.

For the sake of brevity in the description, the neural network model 1000 is shown to be implemented for object identification in images. It will be apparent to a person skilled in the art that practical implementation of the executable graph-based model 100 with signal nodes is not limited to it. Application areas of the executable graph-based model 100 with signal nodes is vast and may include, but is not limited to, pattern recognition, noise filtering, image classification, natural language processing, speech recognition, recommendation systems, financial predictions, autonomous vehicles, convolution neural networks, semantic segmentation, reinforcement learning, social network analysis, brain-computer interface, sensor fusion in autonomous vehicles, human activity recognition, multimodal semantic analysis, medical diagnosis, cybersecurity, financial predications, recurrent neural networks, video analysis and action recognition, speech synthesis and recognition, machine translation, music generation, anomaly detection in time series, long short-term memory networks, robotics and control, natural language understanding, object localization in computer vision, selective attention in natural language processing, visual saliency prediction, biological neural networks simulations, visual attention mechanisms, biological neural network simulations, pattern completion in associative memory, denoising autoencoders, edge detection in computer vision, retina processing, sparse coding, optical character recognition, neural network regularization, pattern generation in central pattern generators, cortical modeling and cognitive simulation, and memory networks and addressable memory.

Having discussed the implementation of the executable graph-based model 100, the description now moves towards a computing system that may be used for such implementations of the executable graph-based model 100.

Figure 11:
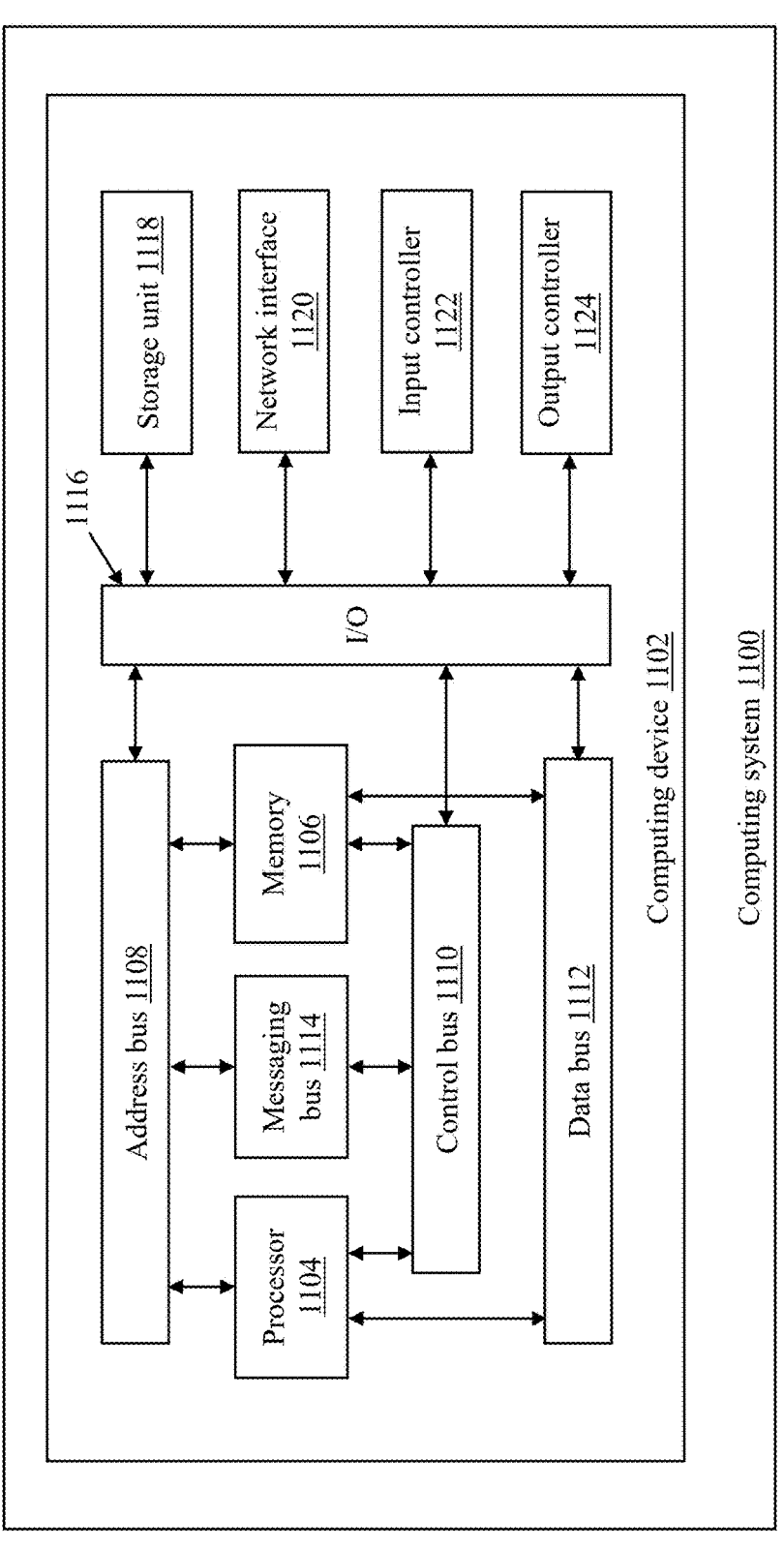
FIG. 11 shows an example computing system for carrying out methods of the present disclosure, consistent with disclosed embodiments of the present disclosure.

FIG. 11 shows an example computing system 1100 for carrying out the methods of the present disclosure, consistent with disclosed embodiments of the present disclosure. Specifically, FIG. 11 shows a block diagram of an embodiment of the computing system 1100 according to example embodiments of the present disclosure.

The computing system 1100 may be configured to perform any of the operations disclosed herein, such as, for example, any of the operations discussed with reference to the functional modules described in relation to FIG. 2. The computing system 1100 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1100 is a distributed system configured to function using multiple computing machines interconnected via a data network or bus system.

The computing system 1100 includes computing devices (such as a computing device 1102). The computing device 1102 includes one or more processors (such as a processor 1104) and a memory 1106. The processor 1104 may be any general-purpose processor(s) configured to execute a set of instructions. For example, the processor 1104 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 1104 may be multiple processing units, a single processing core, multiple processing cores, special purpose processing cores, co-processors, or any combination thereof. The processor 1104 may be communicatively coupled to the memory 1106 via an address bus 1108, a control bus 1110, a data bus 1112, and a messaging bus 1111.

The memory 1106 may include non-volatile memories such as a read-only memory (ROM), a programable read-only memory (PROM), an erasable programmable read-only memory (EPROM), a flash memory, or any other device capable of storing program instructions or data with or without applied power. The memory 1106 may also include volatile memories, such as a random-access memory (RAM), a static random-access memory (SRAM), a dynamic random-access memory (DRAM), and a synchronous dynamic random-access memory (SDRAM). The memory 1106 may include single or multiple memory modules. While the memory 1106 is depicted as part of the computing device 1102, a person skilled in the art will recognize that the memory 1106 can be separate from the computing device 1102.

The memory 1106 may store information that can be accessed by the processor 1104. For instance, the memory 1106 (e.g., one or more non-transitory computer-readable storage mediums, memory devices) may include computer-readable instructions (not shown) that can be executed by the processor 1104. The computer-readable instructions may be software written in any suitable programming language or may be implemented in hardware. Additionally, or alternatively, the computer-readable instructions may be executed in logically and/or virtually separate threads on the processor 1104. For example, the memory 1106 may store instructions (not shown) that when executed by the processor 1104 cause the processor 1104 to perform operations such as any of the operations and functions for which the computing system 1100 is configured, as described herein. Additionally, or alternatively, the memory 1106 may store data (not shown) that can be obtained, received, accessed, written, manipulated, created, and/or stored. The data can include, for instance, the data and/or information described herein in relation to FIGS. 1-10B. In some implementations, the computing device 1102 may obtain from and/or store data in one or more memory device(s) that are remote from the computing system 1100.

The computing device 1102 may further include an input/output (I/O) interface 1116 communicatively coupled to the address bus 1108, the control bus 1110, and the data bus 1112. The data bus 1112 and messaging bus 1114 may include a plurality of tunnels that may support parallel execution of messages by the overlay system 202. The I/O interface 1116 is configured to couple to one or more external devices (e.g., to receive and send data from/to one or more external devices). Such external devices, along with the various internal devices, may also be known as peripheral devices. The I/O interface 1116 may include both electrical and physical connections for operably coupling the various peripheral devices to the computing device 1102. The I/O interface 1116 may be configured to communicate data, addresses, and control signals between the peripheral devices and the computing device 1102. The I/O interface 1116 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, Fire Wire, various video buses, or the like. The I/O interface 1116 is configured to implement only one interface or bus technology. Alternatively, the I/O interface 1116 is configured to implement multiple interfaces or bus technologies. The I/O interface 1116 may include one or more buffers for buffering transmissions between one or more external devices, internal devices, the computing device 1102, or the processor 1104. The I/O interface 1116 may couple the computing device 1102 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1116 may couple the computing device 1102 to various output devices, including video displays, speakers, printers, projectors, tactile feedback devices, automation control, robotic components, actuators, motors, fans, solenoids, valves, pumps, transmitters, signal emitters, lights, and so forth.

The computing system 1100 may further include a storage unit 1118, a network interface 1120, an input controller 1122, and an output controller 1124. The storage unit 1118, the network interface 1120, the input controller 1122, and the output controller 1124 are communicatively coupled to the central control unit (e.g., the memory 1106, the address bus 1108, the control bus 1110, and the data bus 1112) via the I/O interface 1116. The network interface 1120 communicatively couples the computing system 1100 to one or more networks such as wide area networks (WAN), local area networks (LAN), intranets, the Internet, wireless access networks, wired networks, mobile networks, telephone networks, optical networks, or combinations thereof. The network interface 1120 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1118 is a computer-readable medium, preferably a non-transitory computer-readable medium, comprising one or more programs, the one or more programs comprising instructions which when executed by the processor 1104 cause the computing system 1100 to perform the method steps of the present disclosure. Alternatively, the storage unit 1118 is a transitory computer-readable medium. The storage unit 1118 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1118 stores one or more operating systems, application programs, program modules, data, or any other information. The storage unit 1118 is part of the computing device 1102. Alternatively, the storage unit 1118 is part of one or more other computing machines that are in communication with the computing device 1102, such as servers, database servers, cloud storage, network attached storage, and so forth.

The input controller 1122 may include suitable logic, circuitry, interfaces, and/or code, executable by the circuitry, that may be configured to control one or more input devices that may be configured to receive an input (the stimulus 230) for the overlay system 202. The output controller 1124 may include suitable logic, circuitry, interfaces, and/or code, executable by the circuitry, that may be configured to control one or more output devices that may be configured to render/output the outcome of the operation executed to process the received input (the stimulus 230).

Figure 12A:
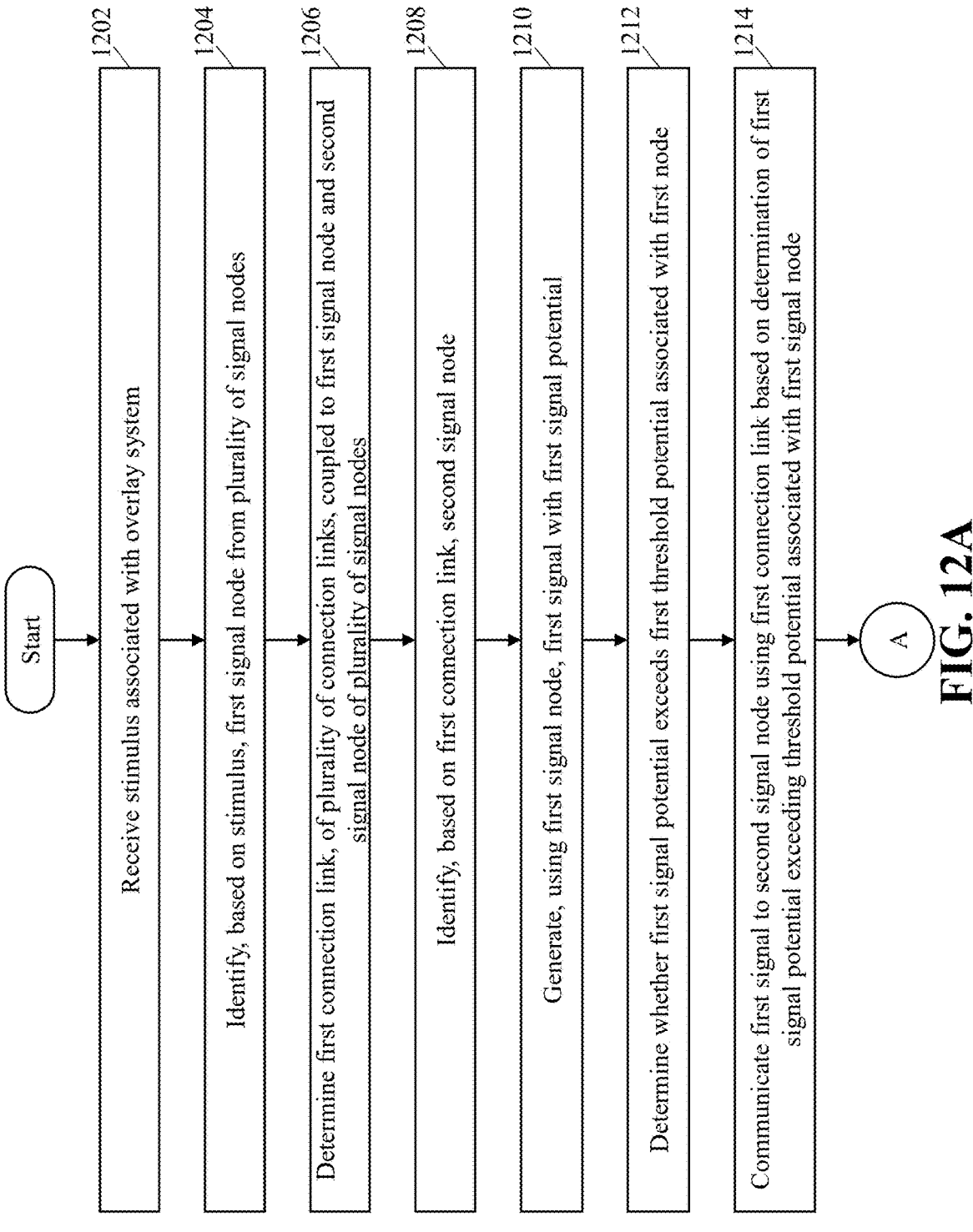
FIGS. 12A and 12B, collectively, illustrate a flowchart of a method for processing a stimulus using a signal node, consistent with disclosed embodiments of the present disclosure.
Figure 12B:
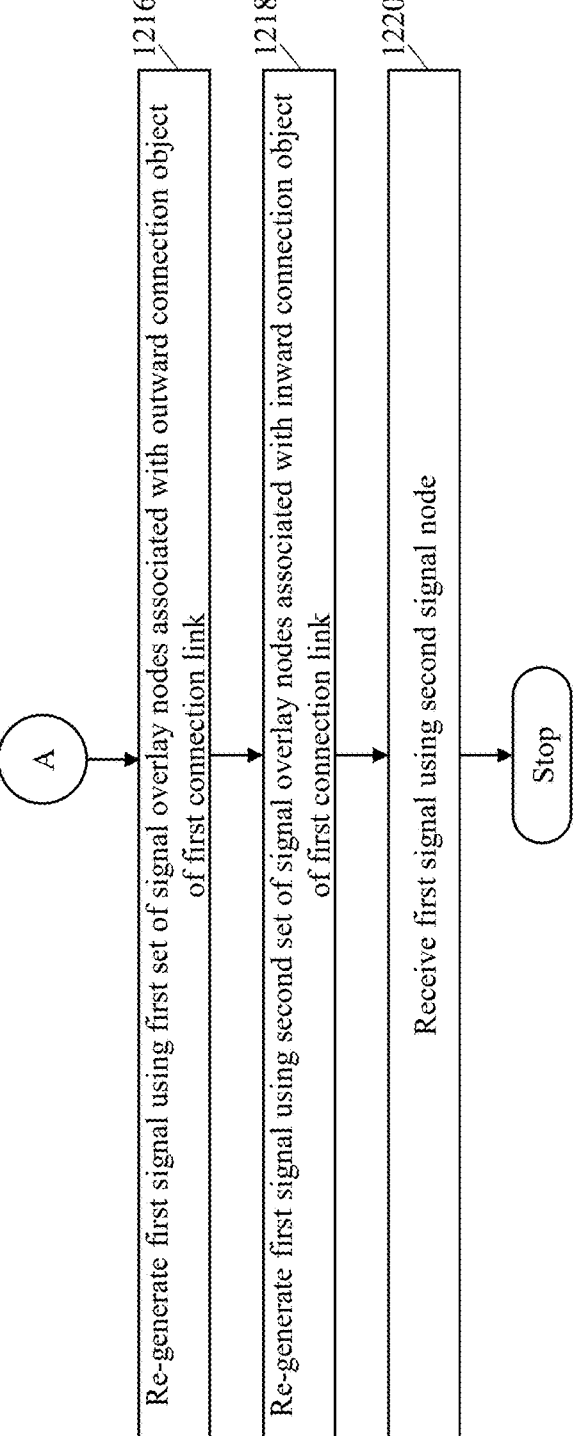

FIGS. 12A and 12B, collectively, illustrate a flowchart 1200 of a method for processing a stimulus using a signal node (for example, the executable signal node 602), consistent with disclosed embodiments of the present disclosure. Referring to FIG. 12A, at 1202, a stimulus is received. The processing circuitry (such as the controller module 206 and the stimuli management module 212) may receive the stimulus associated with the overlay system 202. The stimulus is indicative of an operation to be performed using a first signal node. In some embodiments, the context of the stimulus is matched with the set of defined contexts. The processing circuitry (such as the controller module 206 and the stimuli management module 212) may match the context of the stimulus with the set of defined contexts. Subsequently, it is determined whether a context of the stimulus matches any defined context of the set of defined contexts. The processing circuitry (such as the context module 210) may determine whether the context of the stimulus matches any defined context of the set of defined contexts. In an instance, when it is determined that the context of the stimulus does not match with any of the set of defined contexts, the method terminates. In another instance, when it is determined that the context of the stimulus matches with one or more contexts of the set of defined contexts, 1204 is executed. Alternatively, in some embodiments, the context of the stimulus is not required to be matched and 1204 is executed based on the reception of the stimulus.

At 1204, a first signal node is identified from the plurality of signal nodes of the executable graph-based model 100 based on the stimulus. The processing circuitry (such as the controller module 206, the context module 210, and the stimuli management module 212) may identify the first signal node from the plurality of signal nodes based on the context of the stimulus.

At 1206, a first connection link of the plurality of connection links that couples the first signal node and a second signal node of the plurality of signal nodes is determined based on the identification of the first signal node. The processing circuitry (such as the controller module 206, the context module 210, and the stimuli management module 212) may determine the first connection link.

At 1208, the second signal node is identified based on the first connection link. The processing circuitry (such as the controller module 206, the context module 210, and the stimuli management module 212) may identify the second signal node based on the first connection link.

At 1210, a first signal with a first signal potential is generated using the first signal node. The processing circuitry (such as the controller module 206, the context module 210, and the stimuli management module 212) may generate the first signal with the first signal potential using the first signal node.

At 1212, it is determined whether the first signal potential of the first signal exceeds a potential threshold of the first signal node. The processing circuitry (such as the controller module 206, the context module 210, and the stimuli management module 212) may determine whether the first signal potential of the first signal exceeds the potential threshold of the first signal node. In an instance, when the first signal potential exceeds the potential threshold, 1214 is executed.

At 1214, based on the first signal potential exceeding the potential threshold, the first signal is communicated to the second signal node using the first connection link. The processing circuitry (such as the controller module 206, the context module 210, and the stimuli management module 212) may communicate the first signal to the second signal node using the first connection link.

Referring now to FIG. 12B, at 1216, the first signal is re-generated/modified using a first set of signal overlay nodes associated with an OCO of the first connection link. The processing circuitry (such as the controller module 206, the context module 210, and the stimuli management module 212) may re-generate/modify the first signal by executing processing logic associated with the first set of signal overlay nodes on the first signal.

Subsequently, at 1218, the first signal is re-generated/modified using a second set of signal overlay nodes associated with an ICO of the first connection link. The processing circuitry (such as the controller module 206, the context module 210, and the stimuli management module 212) may re-generate/modify the first signal by executing processing logic associated with the second set of signal overlay nodes on the first signal.

At 1220, the first signal is received using the second signal node. The processing circuitry (such as the controller module 206, the context module 210, and the stimuli management module 212) may receive the first signal using the second signal node.

The disclosed embodiments encompass numerous advantages including a simple and user-friendly implementation of the executable graph-based model 100 that may be in turn used to implement various complex and advanced applications. The disclosed systems and methods allow for the facilitation of signal nodes in the executable graph-based model 100. Notably, the present disclosure facilitates a plurality of signal nodes in an executable graph-based model. A first signal node is associated with a second signal node by way of a connection link that includes a primary role for the first signal node and a secondary role for the second signal node. The primary role and the secondary role indicate a capacity in which the first and second signal nodes are mutually associated. The first signal node may communicate with a second signal node by communicating a signal. The signal may be communicated to the second signal node via the connection link. The connection link may include an OCO associated with the first signal node and an ICO associated with the second signal node. The OCO and the ICO may be associated with corresponding signal overlay nodes. The signal when passes via the OCO and the ICO gets modified/re-generated based on executions of processing logics associated with signal overlay nodes of the OCO and ICO. This allows the signal to exhibit a desired parameter when being received by the second signal node. The reception of the signal exhibiting a desired parameter allows the overlay system 202 to execute an associated operation without having to wait. Therefore, wait time, latency, throughput, processing time, and other such attributes associated with the performance of the overlay system significantly improve. Moreover, such a feature to manipulate an input to a signal node, prevents the overlay system 202 from executing multiple transactions while waiting for a desired input. This significantly reduces a time complexity, processing complexity, and cost complexity of the execution of operations associated with the overlay system 202.

Moreover, the disclosed systems and methods allow for the implementation of various micro-networks using the signal nodes. The micro-networks are logical structures that may be used to implement various logical structures known in the art or to create customized logical structures to achieve a desired output. These micro-networks may be implemented in any executable graph-based application to optimize its performance. As discussed throughout the description, the signal nodes communicate the excitation signal or the inhibition signal. These signals may be manipulated, modified, communicated, or processed in any other way to generate the desired output. The desired output may be provided to one or more other signal nodes to execute a relevant operation. For example, a feedback micro-network may be communicated to the first signal node from the second signal node to propagate the increased signal potential of the signal being generated by the first signal. This in turn may lead to a significant improvement in signal strength of signals generated by other nodes of the feedback micro-network. Similarly, multiple such operations may be performed by implementing various micro-networks. This allows for an optimized use of resources associated with the overlay system 202. Application areas of the overlay system are limitless. Examples of such application areas may include, but are not limited to, pattern recognition, noise filtering, image classification, natural language processing, speech recognition, recommendation systems, financial predictions, autonomous vehicles, convolution neural networks, semantic segmentation, reinforcement learning, social network analysis, brain-computer interface, sensor fusion in autonomous vehicles, human activity recognition, multimodal semantic analysis, medical diagnosis, cybersecurity, financial predications, recurrent neural networks, video analysis and action recognition, speech synthesis and recognition, machine translation, music generation, anomaly detection in time series, long short-term memory networks, robotics and control, natural language understanding, object localization in computer vision, selective attention in natural language processing, visual saliency prediction, biological neural networks simulations, visual attention mechanisms, biological neural network simulations, pattern completion in associative memory, denoising autoencoders, edge detection in computer vision, retina processing, sparse coding, optical character recognition, neural network regularization, pattern generation in central pattern generators, cortical modeling and cognitive simulation, and memory networks and addressable memory.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating a plurality of signal nodes in the executable graph-based model. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:
   a storage element configured to store an executable graph-based model that includes a plurality of signal nodes and a plurality of connection links; and
   processing circuitry that is coupled to the storage element, and configured to:
   receive a stimulus;
   identify, based on the stimulus, a first signal node from the plurality of signal nodes;
   determine a first connection link, of the plurality of connection links, coupled to the first signal node, the first connection link including a first outward connection object defining association with the first signal node and a first inward connection object defining association with a second signal node of the plurality of signal nodes;
   identify, based on the first connection link, the second signal node;
   generate, using the first signal node, a first signal with a first signal potential;
   determine whether the first signal potential exceeds a first potential threshold of the first signal node; and
   communicate, based on the determination of whether the first signal potential exceeds the first potential threshold, the first signal to the second signal node using the first connection link.
2. The overlay system of 1, wherein the communication of the first signal corresponds to processing of the stimulus.
3. The overlay system of 1, wherein the processing circuitry communicates the first signal to the second signal node based on the first signal potential being greater than the first potential threshold.
4. The overlay system of 1,
   wherein the first outward connection object and the first inward connection object have a primary role and a secondary role, respectively,
   wherein the primary role and the secondary role, collectively, indicate a capacity in which the first signal node and the second signal node are mutually associated, and
   wherein the first signal is communicated in conformity with the primary role and the secondary role.
5. The overlay system of 1, wherein the first signal is one of a group consisting of: an excitation signal or an inhibition signal.

6. The overlay system of 5, wherein the excitation signal is a positive signal and the inhibition signal is a negative signal.

7. The overlay signal of 1, wherein the first signal is associated with a timestamp.

8. The overlay system of 1, wherein the first signal is generated further based on a convolution operation performed on a set of signals received by the first signal node prior to the generation of the first signal, and wherein the convolution operation is performed in accordance with a convolution function associated with the first signal node.

9. The overlay system of 1, wherein after the first signal is received by the second signal node, the first signal potential continuously decays in accordance with a decay function associated with the second signal node.

10. The overlay system of 1, wherein a signal node of the plurality of signal nodes is associated with a node configuration, and wherein the node configuration includes at least one of a group consisting of: a signal type, a signal generation function, a convolution function, or a decay function, associated with the signal node.

11. The overlay system of 10, wherein the signal type is at least one of a group consisting of: an excitation signal type or an inhibition signal type.

12. The overlay system of 1, wherein a signal node of the plurality of signal nodes is synchronized with a clock signal associated with the overlay system, and wherein a signal generated by the signal node is synchronized with the clock signal.

13. The overlay system of 1, wherein a signal node of the plurality of signal nodes is associated with a node state, and wherein the node state is one of a group consisting of: an excited state, an inhibited state, an idle state, or an unknown state.

14. The overlay system of 1, wherein based on a stimulus signal associated with the stimulus being a positive signal, the first signal is an excitation signal.

15. The overlay system of 1, wherein based on a stimulus signal associated with the stimulus being a negative signal, the first signal is an inhibition signal.

16. The overlay system of 1, wherein the executable graph-based model further includes a plurality of signal overlay nodes, wherein the processing circuitry is further configured to determine, from the plurality of signal overlay nodes, a first set of signal overlay nodes that is associated with the first signal node, and wherein the first signal is generated further based on the first set of signal overlay nodes.

17. The overlay system of 1, wherein the executable graph-based model further includes a plurality of signal overlay nodes, wherein the processing circuitry is further configured to determine, from the plurality of signal overlay nodes, a second set of signal overlay nodes, a third set of signal overlay nodes, and a fourth set of signal overlay nodes associated with the first outward connection object, the first inward connection object, and the second signal node, respectively, and wherein the processing circuitry is further configured to re-generate the first signal based on at least one of a group consisting of: the second set of signal overlay nodes, the third set of signal overlay nodes, or the fourth set of signal overlay nodes.

18. The overlay system of 17, wherein the re-generation of the first signal corresponds to a modification of at least one of a set of parameters associated with the first signal, and wherein the set of parameters includes at least one of a group consisting of: an amplitude, a frequency, a phase, polarity, sampling rate, resolution, energy, or signal-to-noise ratio, of the first signal.

19. The overlay system of 17, wherein the generation and the re-generation of the first signal are executed further based on a set of parameters associated with the first signal.

20. The overlay system of 19, wherein the set of parameters includes at least one of a group consisting of: an amplitude, a frequency, a phase, polarity, sampling rate, resolution, energy, or signal-to-noise ratio, of the first signal.

21. The overlay system of 17, wherein the generation and the re-generation of the first signal is performed further based on at least one of a group consisting of: a time shift operation, a time scale operation, a correlation operation, an integration operation, a Boolean operation, or a statistical operation.

22. The overlay system of 1, wherein a node-type of a signal node of the plurality of signal nodes is an edge node-type.

23. The overlay system of 1, wherein a connection link of the plurality of connection links is a signal node with a role node-type.

24. The overlay system of 1, wherein prior to the generation of the first signal, the processing circuitry is further configured to load, in the executable graph-based model, at least one of a group consisting of: the first signal node, the second signal node, or the first connection link.

25. The overlay system of 1, wherein upon communication of the first signal, the processing circuitry is further configured to unload at least one of a group consisting of: the first signal node, the second signal node, or the first connection link, from the executable graph-based model.

26. The overlay system of 1, wherein the processing circuitry is further configured to:

determine a second connection link, of the plurality of connection links, coupled to the second signal node, the second connection link including a second outward connection object defining association with the second signal node and a second inward connection object defining association with the first signal node;

generate, using the second signal node, a second signal based on the first signal;

determine whether a second signal potential associated with the second signal exceeds a second potential threshold associated with the second signal node; and communicate, based on the second signal potential being greater than the second potential threshold, the second signal to the first signal node using the second connection link.

27. The overlay system of 1, wherein the processing circuitry is further configured to:

determine a third connection link, of the plurality of connection links, coupled to the second signal node, the third connection link including a third outward connection object defining association with the second signal node and a third inward connection object defining association with a third signal node;

identify, based on the third connection link, the third signal node;

generate, using the second signal node, a third signal based on the communicated first signal;

determine whether a third signal potential associated with the third signal exceeds a third potential threshold associated with the second signal node; and communicate, based on the third signal potential being greater than the third potential threshold, the third signal to the third signal node using the third connection link.

28. The overlay system of 27, wherein the processing circuitry is further configured to:

determine a fourth connection link, of the plurality of connection links, coupled to the third signal node, the fourth connection link including a fourth outward connection object defining association with the third signal node and a fourth inward connection object defining association with the first signal node;

identify, based on the fourth connection link, the first signal node;

generate, using the third signal node, a fourth signal based on the third signal;

determine whether a fourth signal potential associated with the fourth signal exceeds a fourth potential threshold associated with the third signal node; and communicate, based on the fourth signal potential being greater than the fourth potential threshold, the fourth signal to the first signal node using the fourth connection link.

29. The overlay system of 27, wherein the processing circuitry is further configured to:

determine a fifth connection link, of the plurality of connection links, coupled to the third signal node, the fifth connection link including a fifth outward connection object defining association with the third signal node and a fifth inward connection object defining association with a fourth signal node;

identify, based on the fifth connection link, the fourth signal node;

generate, using the third signal node, a fifth signal based on the third signal;

determine whether a fifth signal potential associated with the fifth signal exceeds a fifth potential threshold associated with the third signal node; and communicate, based on the fifth signal potential being greater than the fifth potential threshold, the fifth signal to the fourth signal node using the fifth connection link.

30. The overlay system of 29, wherein the processing circuitry is further configured to:

determine a sixth connection link, of the plurality of connection links, coupled to the fourth signal node, the sixth connection link including a sixth outward connection object defining association with the fourth signal node and a sixth inward connection object defining association with the second signal node;

identify, based on the sixth connection link, the second signal node;

generate, using the fourth signal node, a sixth signal based on the fifth signal;

determine whether a sixth signal potential associated with the sixth signal exceeds a sixth potential threshold associated with the fourth signal node; and communicate, based on the sixth signal potential being greater than the sixth potential threshold, the sixth signal to the second signal node using the sixth connection link.

31. The overlay system of 1, wherein the processing circuitry is further configured to:

identify, based on the stimulus, a seventh signal node from the plurality of signal nodes;

determine a seventh connection link, of the plurality of connection links, coupled to the seventh signal node, the seventh connection link including a seventh outward connection object defining association with the seventh signal node and a seventh inward connection object defining association with the second signal node, wherein the seventh inward connection object and the first inward connection object are associated with the second signal node by way of an inward group object;

identify based on the seventh connection link, the second signal node;

generate, using the seventh signal node, a seventh signal with a seventh signal potential;

determine whether the seventh signal potential exceeds a seventh potential threshold associated with the seventh signal node; and communicate, based on the seventh signal potential being greater than the seventh potential threshold, the seventh signal to the second signal node using the seventh connection link.

32. The overlay system of 1, wherein the processing circuitry is further configured to:

determine an eighth connection link, of the plurality of connection links, coupled to the first signal node, the eighth outward connection object defining association with the first signal node and the eighth inward connection object defining association with an eighth signal node, wherein the eighth outward connection object and the first outward connection object are associated with the first signal node by way of an outward group object;

identify, based on the stimulus, the seventh signal node; and communicate, based on the determination of whether the first signal potential exceeds the first potential threshold, the first signal to the seventh signal node.

33. A method, comprising:

receiving, by processing circuitry of an overlay system, a stimulus, wherein an executable graph-based model is stored in a storage element of the overlay system, and wherein the executable graph-based model includes a plurality of signal nodes and a plurality of connection links;

identifying, by the processing circuitry, based on the stimulus, a first signal node from the plurality of signal nodes;

determining, by the processing circuitry, a first connection link, of the plurality of connection links, coupled to the first signal node, the first connection link including a first outward connection object defining association with the first signal node and a first inward connection object defining association with a second signal node of the plurality of signal nodes;

identifying, by the processing circuitry, based on the first connection link, the second signal node;

generating, by the processing circuitry using the first signal node, a first signal with a first signal potential;

determining, by the processing circuitry, whether the
first signal potential exceeds a first potential thresh-
old associated with the first signal node; and
communicating, by the processing circuitry, the first
signal to the second signal node using the first
connection link based on the determination of
whether the first signal potential exceeds the first
potential threshold.

What is claimed is:

1. An overlay system, comprising:
a storage element configured to store an executable graph-
based model that includes a plurality of signal nodes
and a plurality of connection links; and
processing circuitry that is coupled to the storage element,
and configured to:
receive a stimulus;
identify, based on the stimulus, a first signal node from
the plurality of signal nodes;
determine a first connection link, of the plurality of
connection links, coupled to the first signal node, the
first connection link including a first outward con-
nection object defining association with the first
signal node and a first inward connection object
defining association with a second signal node of the
plurality of signal nodes;
identify, based on the first connection link, the second
signal node;
generate, using the first signal node, a first signal with
a first signal potential;
determine whether the first signal potential exceeds a
first potential threshold of the first signal node; and
communicate, based on the determination of whether
the first signal potential exceeds the first potential
threshold, the first signal to the second signal node
using the first connection link.

2. The overlay system of claim 1, wherein the commu-
nication of the first signal corresponds to processing of the
stimulus.

3. The overlay system of claim 1, wherein the processing
circuitry communicates the first signal to the second signal
node based on the first signal potential being greater than the
first potential threshold.

4. The overlay system of claim 1,
wherein the first signal is one of a group consisting of: an
excitation signal or an inhibition signal, and
wherein the excitation signal is a positive signal and the
inhibition signal is a negative signal.

5. The overlay system of claim 1,
wherein the first signal potential is generated further
based on a convolution operation performed on a set of
signals received by the first signal node prior to the
generation of the first signal, and
wherein the convolution operation is performed in accor-
dance with a convolution function associated with the
first signal node.

6. The overlay system of claim 1, wherein after the first
signal is received by the second signal node, the first signal
potential continuously decays in accordance with a decay
function associated with the second signal node.

7. The overlay system of claim 1,
wherein a signal node of the plurality of signal nodes is
associated with a node configuration, and
wherein the node configuration includes at least one of a
group consisting of: a signal type, a signal generation
function, a convolution function, or a decay function,
associated with the signal node.

8. The overlay system of claim 1, further includes a clock
generator,
wherein a signal node of the plurality of signal nodes is
synchronized with a clock signal of the clock generator,
and
wherein a signal generated by the signal node is synchro-
nized with the clock signal.

9. The overlay system of claim 1,
wherein the executable graph-based model further
includes a plurality of signal overlay nodes,
wherein the processing circuitry is further configured to
determine, from the plurality of signal overlay nodes, a
first set of signal overlay nodes that is associated with
the first signal node, and
wherein the first signal is generated further based on the
first set of signal overlay nodes.

10. The overlay system of claim 1,
wherein the executable graph-based model further
includes a plurality of signal overlay nodes,
wherein a second set of signal overlay nodes, a third set
of signal overlay nodes, and a fourth set of signal
overlay nodes, of the plurality of signal overlay nodes
are associated with the first outward connection object,
the first inward connection object, and the second
signal node, respectively, and
wherein the processing circuitry is further configured to
re-generate the first signal based on at least one of a
group consisting of: the second set of signal overlay
nodes, the third set of signal overlay nodes, or the
fourth set of signal overlay nodes.

11. The overlay system of claim 1,
wherein the executable graph-based model further
includes a plurality of signal overlay nodes,
wherein a first set of signal overlay nodes, a second set of
signal overlay nodes, a third set of signal overlay
nodes, and a fourth set of signal overlay nodes, of the
plurality of signal overlay nodes are associated with the
first signal node, the first outward connection object,
the first inward connection object, and the second
signal node, respectively,
wherein the first signal is generated further based on the
first set of signal overlay nodes, and
wherein the processing circuitry is further configured to
re-generate the first signal based on at least one of a
group consisting of: the second set of signal overlay
nodes, the third set of signal overlay nodes, or the
fourth set of signal overlay nodes.

12. The overlay system of claim 11,
wherein the generation and the re-generation of the first
signal are executed further based on a set of parameters
associated with the first signal, and
wherein the set of parameters includes at least one of a
group consisting of: an amplitude, a frequency, a phase,
polarity, sampling rate, resolution, energy, or signal-to-
noise ratio, of the first signal.

13. The overlay system of claim 1,
wherein a node-type of each of the plurality of signal
nodes is an edge node-type, and
wherein a connection link of the plurality of connection
links is a signal node with a role node-type.

14. The overlay system of claim 1, wherein the processing
circuitry is further configured to:
determine a second connection link, of the plurality of
connection links, coupled to the second signal node, the
second connection link including a second outward
connection object defining association with the second signal node and a second inward connection object defining association with the first signal node;

generate, using the second signal node, a second signal based on the first signal;

determine whether a second signal potential associated with the second signal exceeds a second potential threshold associated with the second signal node; and communicate, based on the second signal potential being greater than the second potential threshold, the second signal to the first signal node using the second connection link.

15. The overlay system of claim 1, wherein the processing circuitry is further configured to:

determine a third connection link, of the plurality of connection links, coupled to the second signal node, the third connection link including a third outward connection object defining association with the second signal node and a third inward connection object defining association with a third signal node;

identify, based on the third connection link, the third signal node;

generate, using the second signal node, a third signal based on the first signal;

determine whether a third signal potential associated with the third signal exceeds a third potential threshold associated with the second signal node; and communicate, based on the third signal potential being greater than the third potential threshold, the third signal to the third signal node using the third connection link.

16. The overlay system of claim 15, wherein the processing circuitry is further configured to:

determine a fourth connection link, of the plurality of connection links, coupled to the third signal node, the fourth connection link including a fourth outward connection object defining association with the third signal node and a fourth inward connection object defining association with a fourth signal node;

identify, based on the fourth connection link, the fourth signal node;

generate, using the third signal node, a fourth signal based on the third signal;

determine whether a fourth signal potential associated with the fourth signal exceeds a fourth potential threshold associated with the third signal node; and communicate, based on the fourth signal potential being greater than the fourth potential threshold, the fourth signal to the fourth signal node using the fourth connection link.

17. The overlay system of claim 16, wherein the processing circuitry is further configured to:

determine a fifth connection link, of the plurality of connection links, coupled to the fourth signal node, the fifth connection link including a fifth outward connection object defining association with the fourth signal node and a fifth inward connection object defining association with the second signal node;

identify, based on the fifth connection link, the second signal node;

generate, using the fourth signal node, a fifth signal based on the fourth signal;

determine whether a fifth signal potential associated with the fifth signal exceeds a fifth potential threshold associated with the fourth signal node; and communicate, based on the fifth signal potential being greater than the fifth potential threshold, the fifth signal to the second signal node using the fifth connection link.

18. The overlay system of claim 1, wherein the processing circuitry is further configured to:

identify, based on the stimulus, a fifth signal node from the plurality of signal nodes;

determine a sixth connection link, of the plurality of connection links, coupled to the fifth signal node, the sixth connection link including a sixth outward connection object defining association with the fifth signal node and a sixth inward connection object defining association with the second signal node, wherein the sixth inward connection object and the first inward connection object are associated with the second signal node by way of an inward group object;

identify based on the sixth connection link, the second signal node;

generate, using the fifth signal node, a sixth signal with a sixth signal potential;

determine whether the sixth signal potential exceeds a sixth potential threshold associated with the fifth signal node; and communicate, based on the sixth signal potential being greater than the sixth potential threshold, the sixth signal to the second signal node using the sixth connection link.

19. The overlay system of claim 1, wherein the processing circuitry is further configured to:

determine a seventh connection link, of the plurality of connection links, coupled to the first signal node and including a seventh outward connection object defining association with the first signal node and a seventh inward connection object defining association with a sixth signal node, wherein the seventh outward connection object and the first outward connection object are associated with the first signal node by way of an outward group object;

identify, based on the stimulus, the sixth signal node; and communicate, based on the determination of whether the first signal potential exceeds the first potential threshold, the first signal to the sixth signal node using the seventh connection link.

20. A method, comprising:

receiving, by processing circuitry of an overlay system, a stimulus, wherein an executable graph-based model is stored in a storage element of the overlay system, and wherein the executable graph-based model includes a plurality of signal nodes and a plurality of connection links;

identifying, by the processing circuitry, based on the stimulus, a first signal node from the plurality of signal nodes;

determining, by the processing circuitry, a first connection link, of the plurality of connection links, coupled to the first signal node, the first connection link including a first outward connection object defining association with the first signal node and a first inward connection object defining association with a second signal node of the plurality of signal nodes;

identifying, by the processing circuitry, based on the first connection link, the second signal node;

generating, by the processing circuitry using the first signal node, a signal with a signal potential;

determining, by the processing circuitry, whether the signal potential exceeds a potential threshold associated with the first signal node; and communicating, by the processing circuitry, the signal to the second signal node using the first connection link based on the determination of whether the signal potential exceeds the potential threshold.

\* \* \* \* \*